United States Patent
Choi et al.

(10) Patent No.: US 10,725,228 B2
(45) Date of Patent: *Jul. 28, 2020

(54) ELECTRONIC DEVICE DISPLAY WITH SWITCHABLE FILM STRUCTURES

(71) Applicant: Apple Inc., Cupertino, CA (US)

(72) Inventors: Hyungryul J. Choi, San Jose, CA (US); Zhibing Ge, Sunnyvale, CA (US); Cheng Chen, San Jose, CA (US); Hossein Nemati, Santa Clara, CA (US); Wei Chen, Palo Alto, CA (US); Jun Qi, Cupertino, CA (US); Khadijeh Bayat, San Jose, CA (US); David A. Doyle, San Francisco, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,925

(22) Filed: Feb. 20, 2019

(65) Prior Publication Data
US 2019/0179074 A1 Jun. 13, 2019

Related U.S. Application Data

(63) Continuation of application No. 15/051,047, filed on Feb. 23, 2016, now Pat. No. 10,247,982.
(Continued)

(51) Int. Cl.
*G02F 1/13* (2006.01)
*F21V 8/00* (2006.01)
(Continued)

(52) U.S. Cl.
CPC .......... *G02B 6/0051* (2013.01); *G02B 6/005* (2013.01); *G02F 1/1323* (2013.01);
(Continued)

(58) Field of Classification Search
CPC ......... G02F 1/133615; G02F 1/133626; G02F 1/133514; G02F 1/13306; G02F 1/1368; G02F 1/137; G02B 6/005
See application file for complete search history.

(56) References Cited

U.S. PATENT DOCUMENTS

| 4,727,690 A | 3/1988 | Honeyman |
| 5,052,824 A | 10/1991 | Van Wyk |

(Continued)

FOREIGN PATENT DOCUMENTS

| GB | 2428100 | 1/2007 |
| GB | 2428101 | 1/2007 |
| JP | 2007052406 | 3/2007 |

*Primary Examiner* — Dung T Nguyen
(74) *Attorney, Agent, or Firm* — Treyz Law Group, P.C.

(57) ABSTRACT

An electronic device may generate content that is to be displayed on a display. The display may have an array of liquid crystal display pixels for displaying image frames of the content. The display may be operated in at least a normal viewing mode, a privacy mode, an outdoor viewing mode, and a power saving mode. The different view modes may exhibit different viewing angles. In one configuration, the display may include a backlight unit that generates a collimated light source and that includes a switchable diffuser film for selectively scattering the collimated light source depending on the current viewing mode of the display. In another configuration, the display may include a backlight unit that generates a scattered light source that includes a switchable microarray structure such as a switchable mirror structure or a tunable microlens array for selectively collimating the scattered light source depending on the current viewing mode.

20 Claims, 23 Drawing Sheets

Related U.S. Application Data

(60) Provisional application No. 62/170,603, filed on Jun. 3, 2015.

(51) Int. Cl.
*G02F 1/13357* (2006.01)
*G02F 1/1334* (2006.01)
*G02F 1/29* (2006.01)
*G02F 1/1333* (2006.01)
*G02F 1/1335* (2006.01)
*G02F 1/1343* (2006.01)
*G02F 1/139* (2006.01)
*G02F 1/137* (2006.01)

(52) U.S. Cl.
CPC .......... *G02F 1/1336* (2013.01); *G02F 1/1334* (2013.01); *G02F 1/1393* (2013.01); *G02F 1/13338* (2013.01); *G02F 1/13439* (2013.01); *G02F 1/133526* (2013.01); *G02F 1/133528* (2013.01); *G02F 1/134309* (2013.01); *G02F 2001/13793* (2013.01); *G02F 2001/133626* (2013.01); *G02F 2001/294* (2013.01); *G02F 2203/50* (2013.01); *G09G 2320/068* (2013.01)

(56) References Cited

U.S. PATENT DOCUMENTS

| | | |
|---|---|---|
| 5,600,456 A | 2/1997 | Maruyama et al. |
| 6,211,930 B1 | 4/2001 | Sautter et al. |
| 6,937,308 B2 | 8/2005 | Ishikawa et al. |
| 7,639,327 B2 | 12/2009 | Ozawa |
| 8,269,919 B2 | 9/2012 | Mimura et al. |
| 8,314,918 B2 | 11/2012 | Kean et al. |
| 8,717,519 B2 | 5/2014 | Park et al. |
| 10,247,982 B2 * | 4/2019 | Choi ............... G02F 1/1323 |
| 2007/0030427 A1 | 2/2007 | Hisatake |
| 2009/0225244 A1 | 9/2009 | Wang et al. |
| 2010/0265435 A1 | 10/2010 | Hwang et al. |
| 2010/0295755 A1 | 11/2010 | Broughton et al. |

* cited by examiner

ELECTRONIC DEVICE DISPLAY WITH SWITCHABLE FILM STRUCTURES

This application is a continuation of patent application Ser. No. 15/051,047, filed Feb. 23, 2016, which claims the benefit of provisional patent application No. 62/170,603, filed Jun. 3, 2015, both of which are hereby incorporated by reference herein in their entireties.

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Pixels in a liquid crystal display contain thin-film transistors and pixel electrodes for applying electric fields to the liquid crystal material. The strength of the electric field in a pixel controls the polarization state of the liquid crystal material and thereby adjusts the brightness of the pixel.

Conventional liquid crystal displays typically exhibit a fixed viewing angle. For example, a user of the liquid crystal display may be able to view images on the display up to 45 degrees deviation from the normal viewing axis. In certain scenarios, however, it may be desirable to adjust and/or to reduce the viewing angle of the display. Existing solutions for reducing the viewing angle of liquid crystal displays involve use of an external privacy filter that needs to be mounted over the display. The use of external privacy filters or other types of external brightness adjustment films may, however, introduce unwanted reflections and glare and are often costly and unwieldy for the user to purchase and maintain.

It would therefore be desirable to be able to provide displays with built-in adjustable light output profiles.

SUMMARY

An electronic device may generate content that is to be displayed on a display. The display may be a liquid crystal display have an array of liquid crystal display pixels. Display driver circuitry in the display may display image frames on the array of pixels.

In accordance with an embodiment, the display may include display layers having display pixels formed from thin-film transistor structures and a backlight unit that emits light through the display layers. The backlight unit may be configurable in a first mode in which the electronic device display exhibits a first viewing angle and in a second mode in which the electronic device display exhibits a second viewing angle that is different than the first viewing angle.

For example, the display may be operable in a normal viewing mode, a privacy mode, an outdoor viewing mode, and a power saving mode. When operated in the privacy mode, the display may be limited to at most a 30° viewing angle. The normal viewing mode may provide a nominal on-axis luminance level, whereas the outdoor viewing mode may provide an elevated on-axis luminance level that is greater than the nominal on-axis luminance level without actually consuming more power than in the normal viewing mode. In the power saving mode, the display may also provide the nominal on-axis luminance while actually consuming less power than the normal viewing mode.

The backlight unit may include a switchable layer that selectively alters the direction of light that is emitted from the backlight unit to the display layers. In one suitable embodiment, the backlight unit includes: a light source for generating light, a light guide plate that receives the light from the light source and that outputs backlight towards the display layers, a turning film for collimating the backlight output from the light guide plate, and a switchable diffuser film that receives the collimated backlight from the turning film and that is configured to selectively alter the collimated backlight. The switchable diffuser film is operable in a first state that passes through the collimated backlight to the display layers and is also operable in a second state that scatters the collimated backlight.

In another suitable embodiment, the backlight unit may include: a light source for generating light, a light guide plate that receives the light from the light source and that outputs backlight towards the display layers, and a switchable microarray structure that is selectively activated to collimate the backlight. The switchable microarray structure may include a switchable mirror structure having a plurality of gaps that is configured to convert the backlight into an array of point light sources. In one suitable configuration, the switchable microarray structure further includes polymer material that is formed on the switchable mirror structure and that forms pyramid-shaped cavities surrounding each of the gaps. In another suitable configuration, the switchable microarray structure further includes an array of microlens each of which has a center that is aligned to a respective one of the gaps.

In yet other configurations, the switchable microarray structure may be implemented using tunable lens structures selected from the group consisting of: mechanically driven microlens structures, microfluidic devices, polymer network liquid crystal (PNLC) based microlens structures, piezoelectrically driven liquid lens structures, and ultrasonic transparent gel based lens structures.

Further features of the invention, its nature and various advantages will be more apparent from the accompanying drawings and following detailed description.

DETAILED DESCRIPTION

Electronic devices may include displays. The displays may be used to display images to a user. Illustrative electronic devices that may be provided with displays are shown in FIGS. 1, 2, 3, and 4.

Figure 1:
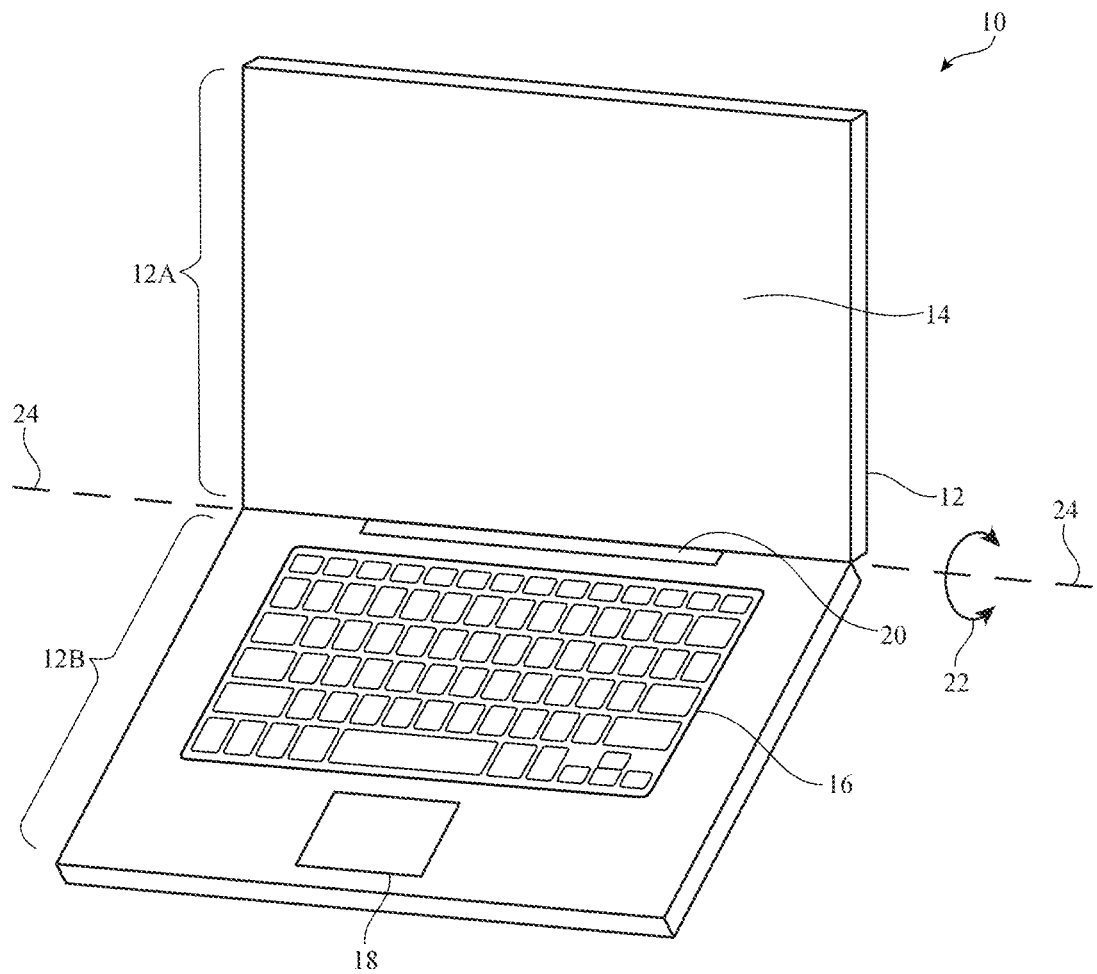
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
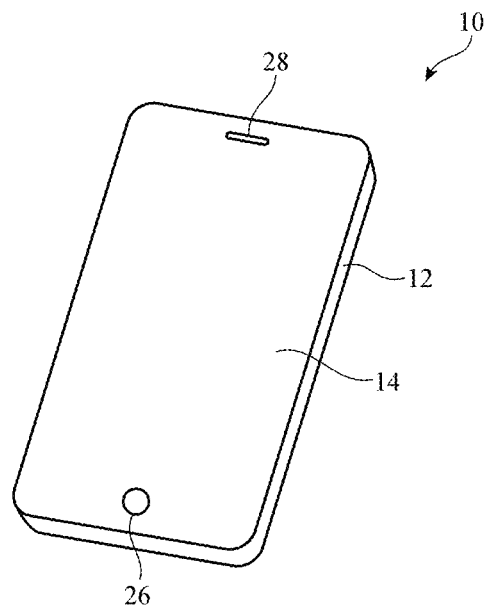
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, watch, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2). In compact devices such as wrist-watch devices, port 28 and/or button 26 may be omitted and device 10 may be provided with a strap or lanyard.

Figure 3:
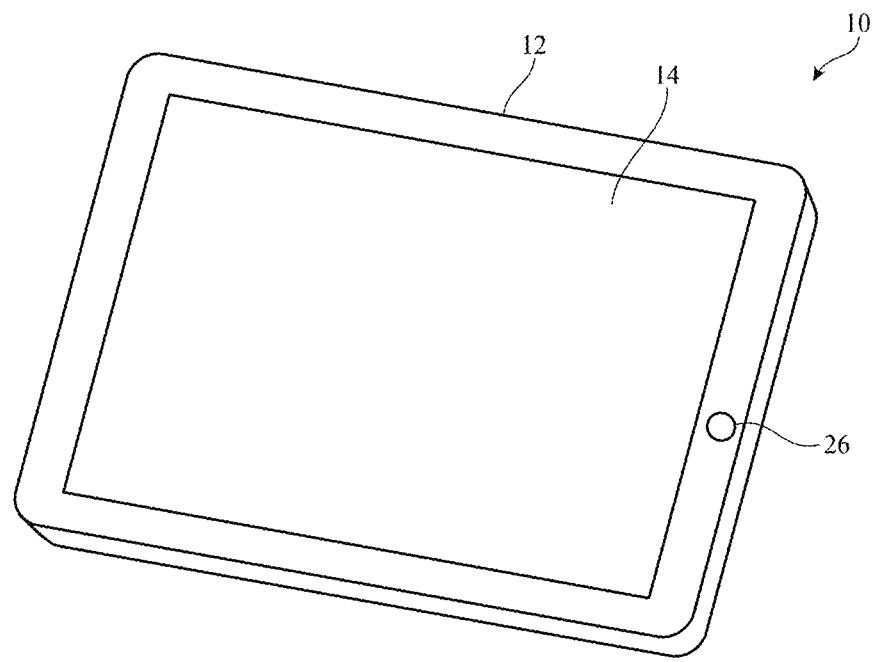
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
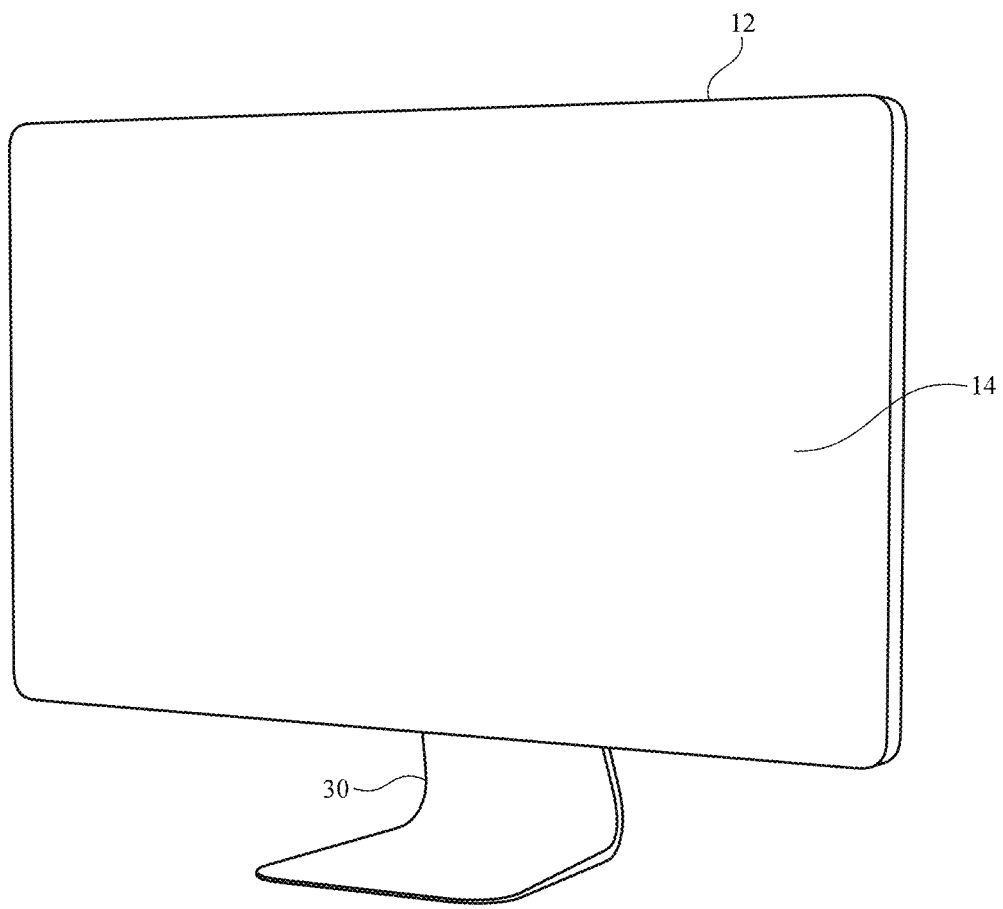
FIG. 4 is a perspective view of an illustrative electronic device such as a computer or other device with display structures in accordance with an embodiment.

FIG. 4 shows how electronic device 10 may be a display such as a computer monitor, a computer that has been integrated into a computer display, or other device with a built-in display. With this type of arrangement, housing 12 for device 10 may be mounted on a support structure such as stand 30 or stand 30 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
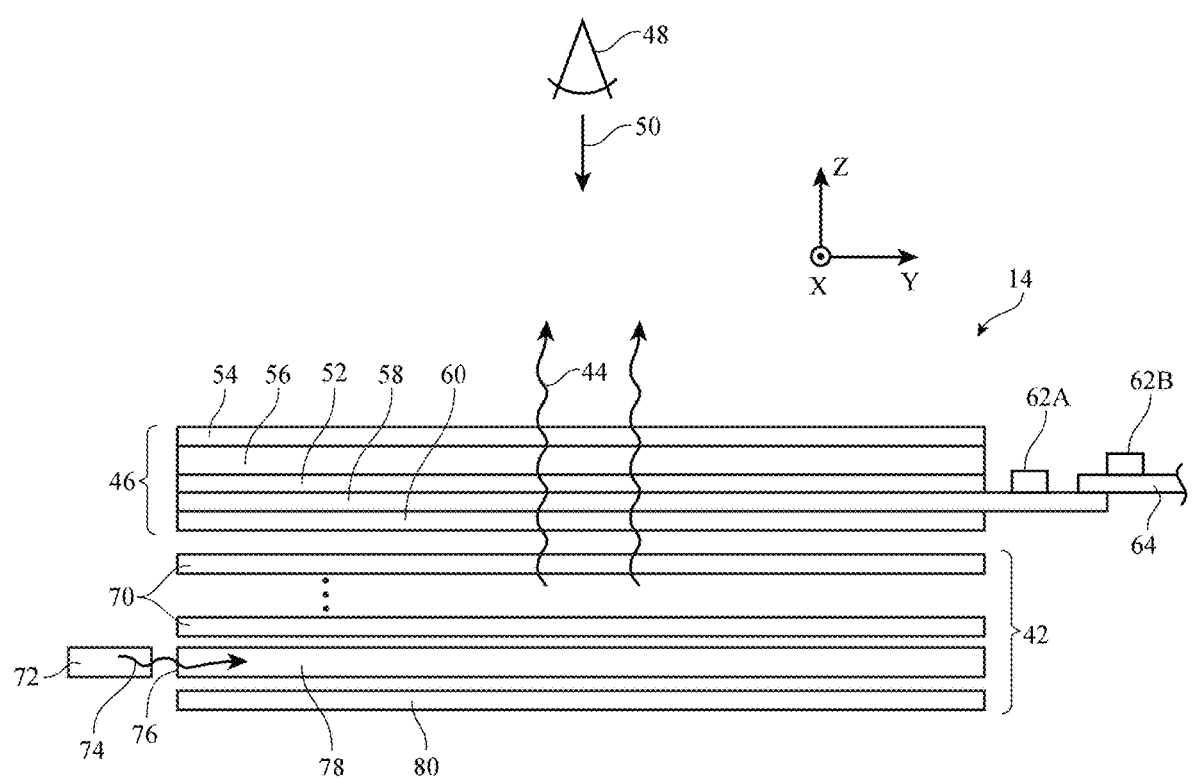
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78. Light source 72 may be located at the left of light guide plate 78 as shown in FIG. 5 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of plastic covered with a dielectric mirror thin-film coating.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Figure 6:
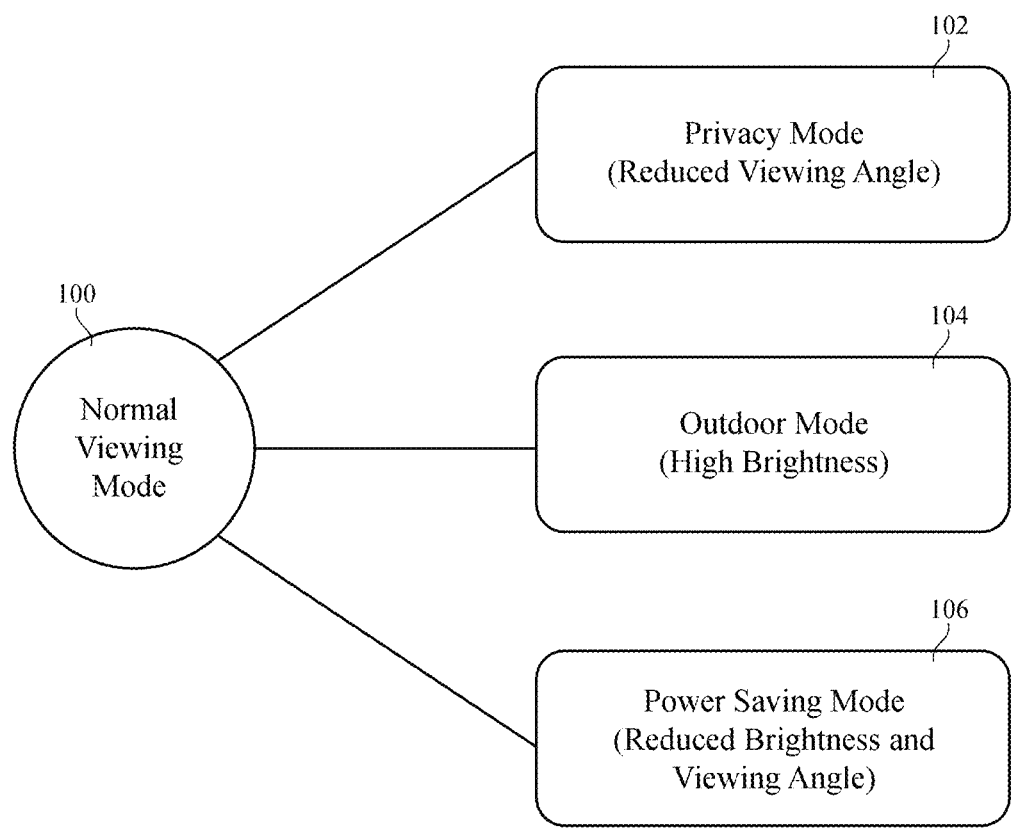
FIG. 6 is a diagram showing how an illustrative display can be configured to operate in different viewing modes in accordance with an embodiment.

In accordance with an embodiment of the present invention, display 14 may be configured to operate in various user viewing modes. FIG. 6 is a diagram showing different viewing modes in which display 14 can be configured to operate. As shown in FIG. 6, display 14 may be configured to operate in at least a normal viewing mode 100, a privacy viewing mode 102, an outdoor viewing mode 104, and a power saving mode 106. Under normal lighting conditions (e.g., when display 14 is used indoors), display 14 may be placed in normal viewing mode 100 that exhibits a nominal viewing angle and a nominal display brightness level. When it is desired to reduce the viewing angle of display 14 below the nominal view angle, display 14 may be placed in privacy mode 102. Under bright ambient lighting conditions (e.g., when display 14 is used outdoors in bright sunny conditions), display 14 may be placed in outdoor viewing mode 104 that boosts the display brightness beyond the nominal level so that the content on display 14 is more visible to the user. When it is desired to minimize power consumption of the electronic device, display 14 may be placed in power saving mode 106 that exhibits a reduced display brightness level and optionally reduced viewing angle.

Figure 7:
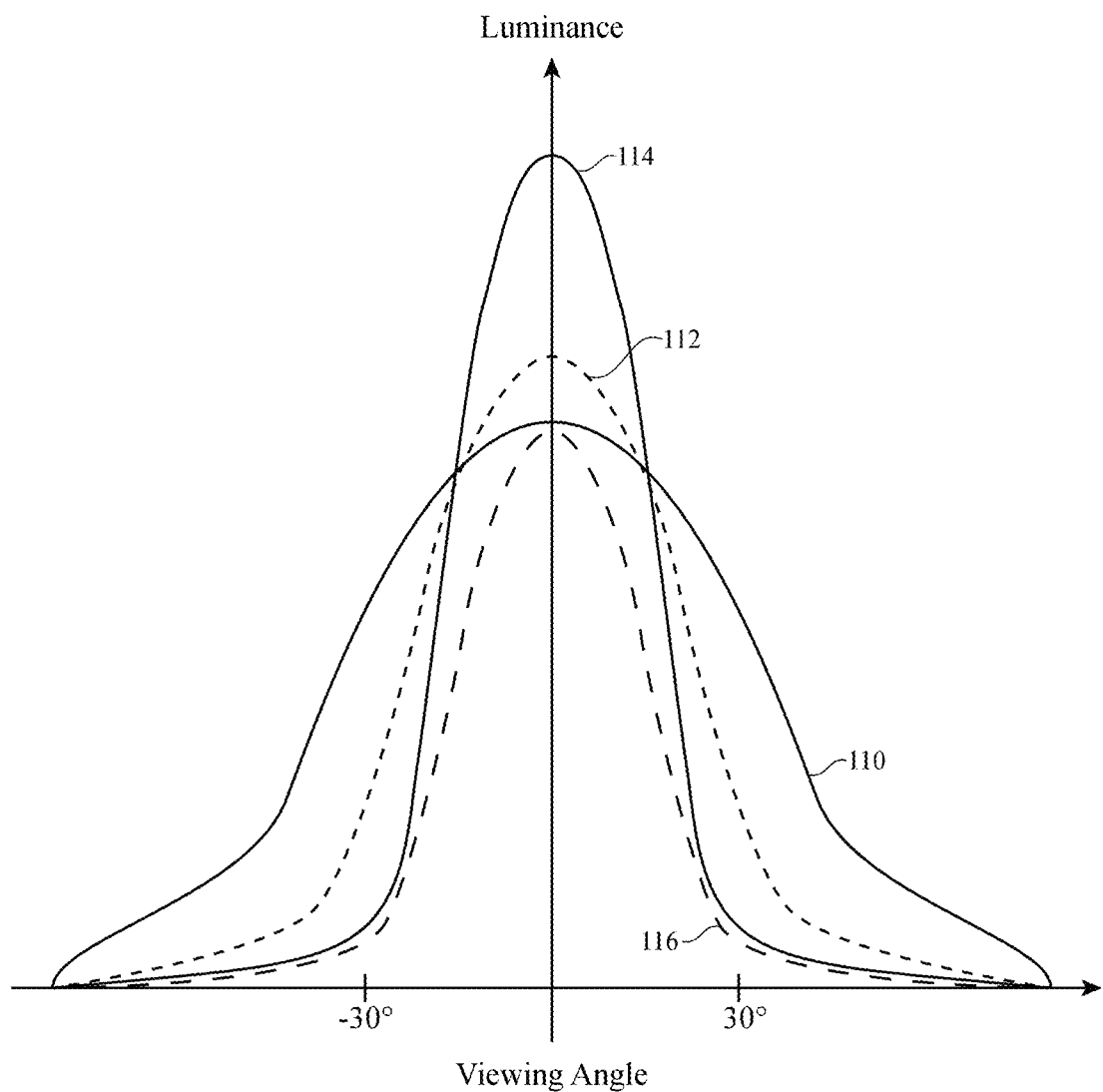
FIG. 7 is a diagram showing different light output profiles associated with the different view modes of FIG. 6 in accordance with an embodiment.

FIG. 7 is a diagram plotting average picture luminance versus viewing angle illustrating different light output profiles associated with the different view modes of FIG. 6. As shown in FIG. 7, curve 110 represents the light output profile for normal view mode 100; curve 112 represents the light output profile for privacy mode 102; curve 114 represents the light output profile for outdoor viewing mode 104; and curve 116 represents the light output profile for power saving mode 106. Curve 110 shows how the normal viewing mode exhibits a relatively wide viewing angle with a cone of vision of greater than 30° (e.g., with a viewing angle of more than 45° or more than 60°). While this may be convenient for collaborative purposes when display 14 is used to display content to a group of users positioned at varying angles relative to the normal viewing axis, the user may sometimes wish for the display to have a more limited cone of vision for privacy purposes. Curve 112 shows how the privacy mode exhibits a substantially reduced viewing angle with a viewing angle of less than 45° or less than 30° (see, curve 112 is substantially "narrower" than curve 110).

Curve 114 shows how display 14 may be configured to focus its light output to provide a boosted on-axis luminance intensity during bright ambient lighting conditions. If desired, curve 114 may exhibit an even narrower cone of vision than curve 112. By focusing the light towards the user without wasting energy emitting light at larger viewing angles, the outdoor viewing mode is able to provide a boosted brightness level (e.g., with up to two times or more of the on-axis luminance intensity of the normal viewing mode) without increasing a net neutral display power consumption relative to the normal viewing mode. Curve 116 shows how display 14 may be configured to save power by also reducing the viewing angle without compromising on the brightness level along the normal viewing axis. In certain embodiments, power saving mode 106 may be similar or identical to privacy mode 102 and/or outdoor mode 104, except the on-axis luminance level for the outdoor mode may be higher to facilitate the display of content in sunny conditions.

Figure 8:
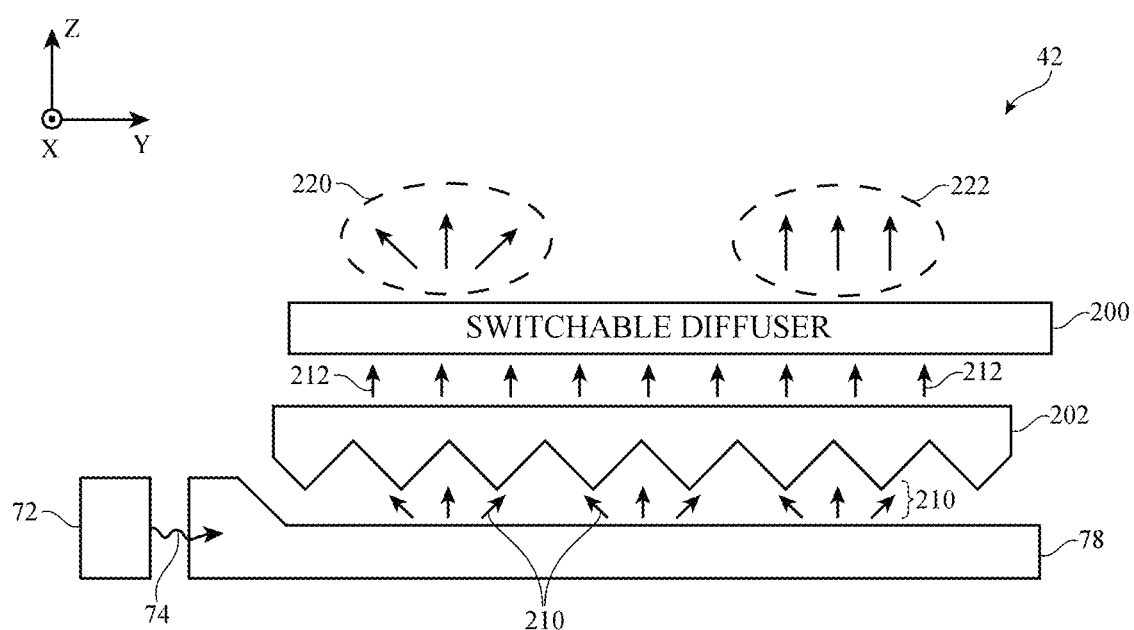
FIG. 8 is a cross-sectional side view of an illustrative backlight unit with a switchable diffuser in accordance with an embodiment.

In accordance with an embodiment, the different display modes described above may be implemented using a switchable diffuser film in the backlight unit. FIG. 8 is a cross-sectional side view showing how backlight unit 42 may be provided with a switchable diffuser. As shown in FIG. 8, backlight unit 42 may include a light source 72 (e.g., an LED light source) for emitting light 74 into light guide plate 78, a brightness enhancement film such as a turning film 202, and a switchable diffuser film 200. Switchable diffuser 200 may be configured in an on state, an off state, or optionally one or more intermediate states for enhanced tunability.

In the embodiment of FIG. 8, light guide plate 78 may include light scattering features for emitting a generally scattered light source 210 upwards in direction Z. Turning film 202 may serve to convert scattered light 210 into a collimated light source 212. The use of turning films as part of the backlight unit is generally relatively rare in the art since turning films output a light source with a fairly limited cone of vision, which is oftentimes unsuitable for use in normal electronic device displays. Turning film 202 can, however, be paired with switchable diffuser 200 to either generate scattered light 220 when switchable diffuser 200 is the off state or to pass through the focused light 222 when switchable diffuser 200 is in the on state. The configuration of the different display modes in FIG. 6 can therefore be controlled by adjusting the state of switchable diffuser 200 (e.g., diffuser 200 can be turned off to place the display in normal viewing mode or can be turned on to place the display in one of modes 102, 104, or 106).

Figure 9:
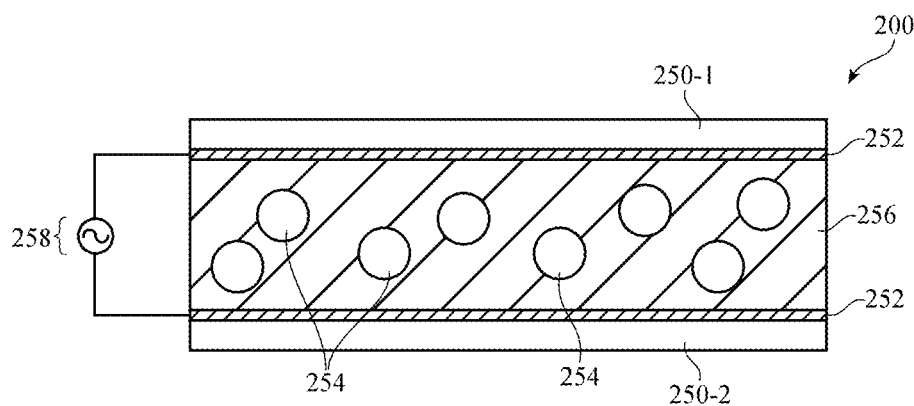
FIG. 9 is a cross-sectional side view of an illustrative switchable diffuser having a single layer of polymer dispersed liquid crystal (PDLC) in accordance with an embodiment.

FIG. 9 is a cross-sectional side view of an illustrative switchable diffuser film 200 having a single layer of polymer dispersed liquid crystal (PDLC) in accordance with an embodiment. As shown in FIG. 9, liquid crystal droplets 254 may be dispersed in a layer of polymer 256 between transparent substrates 250-1 and 250-2. Substrates 250-1 and 250-2 may be formed from glass, plastic, or other transparent substrate material. Transparent conductive materials such as a layer of indium tin oxide (ITO) 252 may be formed on each of substrates 250-1 and 250-2 to control the behavior of the PDLC. In the example of FIG. 9, a voltage source 258 may be used to apply some amount of voltage onto layers 252 to control the orientation of the liquid crystal material in droplets 254. For example, switchable diffuser 200 may be placed in the off state when no voltage is applied or may be placed in the on state when a nominal voltage level is applied. If desired, an intermediate voltage level that is between zero volts and the nominal high voltage level may be applied to fine tune the optical behavior of diffuser film 200 to place display 14 in a selected one of the user viewing modes (e.g., the different viewing modes as described in connection with FIG. 6).

Figure 10:
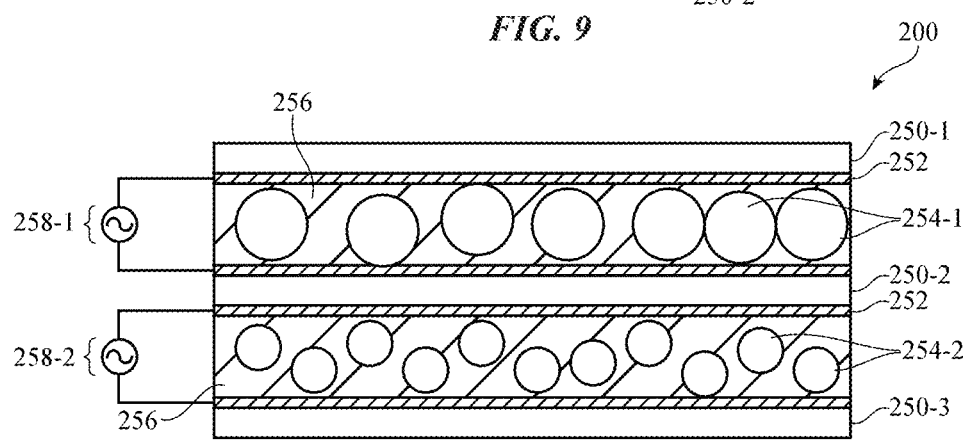
FIG. 10 is a cross-sectional side view of an illustrative switchable diffuser having two layers of PDLC with different droplet sizes in accordance with an embodiment.

FIG. 10 shows another suitable arrangement in which switchable diffuser 200 is provided with two layers of PDLC. As shown in FIG. 10, liquid crystal droplets 254-1 formed between transparent substrates 250-1 and 250-2 may have a first size, whereas liquid crystal droplets 254-2 formed between transparent substrates 250-2 and 250-3 may have a second size that is different than the first size. A first voltage source 258-1 may be used to control the behavior of droplets 254-1, whereas a second voltage source 258-2 may be used to control the behavior of droplets 254-2. For example, display 14 may be placed in the normal viewing mode by turning off both voltage sources 258-1 and 258-2. Display 14 may be placed in the privacy mode by turning on only voltage source 258-1, in the outdoor mode by turning on only voltage source 258-2, or in the power saving mode by turning on both voltage sources 258-1 and 258-2. This example is merely illustrative. If desired, voltage sources 258-1 and 258-2 can be tuned individually to provide the desired light output profile for each of the various user viewing modes.

Figure 11:
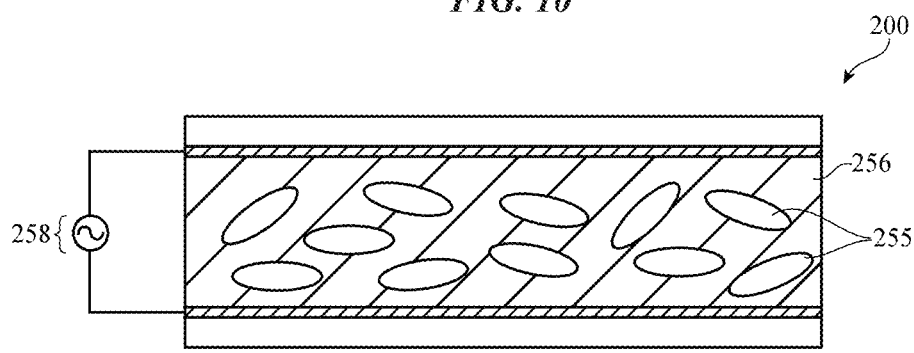
FIG. 11 is a cross-sectional side view of an illustrative switchable diffuser formed using PDLC with asymmetric droplets in accordance with an embodiment.
Figure 12:
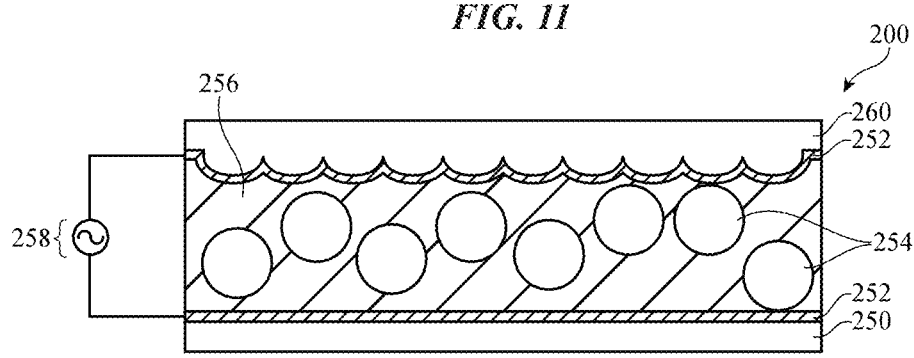
FIG. 12 is a cross-sectional side view of an illustrative switchable diffuser formed using PDLC with embedded microlens structures in accordance with an embodiment.

FIGS. 11 and 12 show other suitable arrangements of the switchable diffuser film 200. As shown in FIG. 11, the switchable diffuser film may be provided with asymmetric droplets 255. As shown in FIG. 12, the switchable diffuser may be provided with embedded microlens structures 260 for further control of the transmitted light. The microlens structures 260 of FIG. 12 may not be switchable.

The different embodiments of FIGS. 9-12 for implementing a switchable diffuser film using PDLC is merely illustrative and do not serve to limit the scope of the present invention. If desired, switchable diffuser film 200 may be implemented using polymer network liquid crystal (PNLC) material, polymer stabilized cholesteric texture (PSCT) material, a combination of these materials, and/or other suitable adjustable light diffusing materials.

Figure 13:
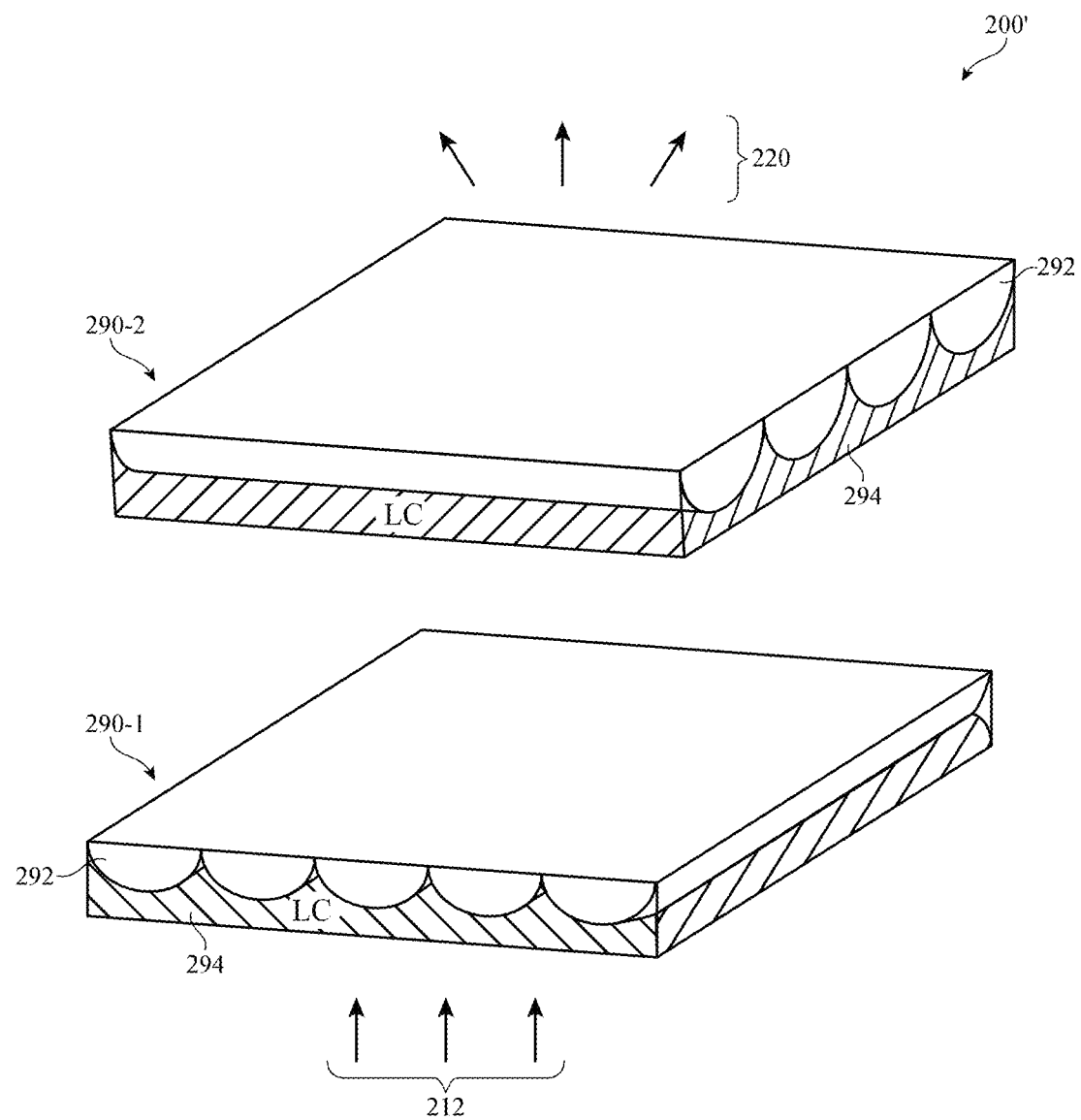
FIG. 13 is a perspective view of an illustrative switchable diffuser formed using switching liquid crystal (LC) lens array structures in accordance with an embodiment.

In another suitable arrangement, the switchable diffuser film may also be implemented using a switchable liquid crystal (LC) lens array structure (see, e.g., switchable diffuser 200' in FIG. 13). As shown in FIG. 13, switchable diffuser 200' may include a first adjustable LC lens array 290-1 stacked with a second adjustable LC lens array 290-2. Each layer of adjustable LC lens array may include rows of cylindrical lenses 292 covered with liquid crystal material 294. The cylindrical microlenses in layer 290-1 may be formed perpendicular to the cylindrical microlenses in layer 290-2 to help focus light from two orthogonal directions. In particular, lenses 292 may be polymer microlenses and may exhibit a "concave-up" orientation for selectively scattering light. Layers 290-1 and 290-2 may be provided with patterned electrodes (e.g., conductive ITO structures) that may be selectively biases using voltage sources (not shown) to modulate the optical properties of the LC material 294.

For example, a high voltage may be applied across the liquid crystal material 294 so that the liquid crystal material 294 exhibits the same index of refraction as the polymer microlenses 292. When microlenses 292 and the liquid crystal material 294 are index-matched, no lensing effect is provided and the collimated light 212 from the backlight unit is allowed to pass through substantially unscattered. When a low voltage is applied across the liquid crystal material 294, the liquid crystal material 294 may exhibit a different refractive index as the polymer microlenses 292. When the index of refraction of the microlenses 292 and the liquid crystal material 294 are mismatched, microlenses 292 are effectively switched into use to scatter the incoming collimated backlight 212 to generate a scattered outgoing light 220. This example is merely illustrative. In general, any desired amount of voltage can be applied to the LC material so that switchable diffuser 200' exhibits the desired optical transmission/scattering property for each of the different view modes described in connection with FIG. 6. The example of FIG. 13 in which the microlenses are formed in a regular periodic configuration is merely illustrative. If desired, the microlens structures may be formed with random varying pitches and widths and may exhibit non-cylindrical shapes.

Figure 18:
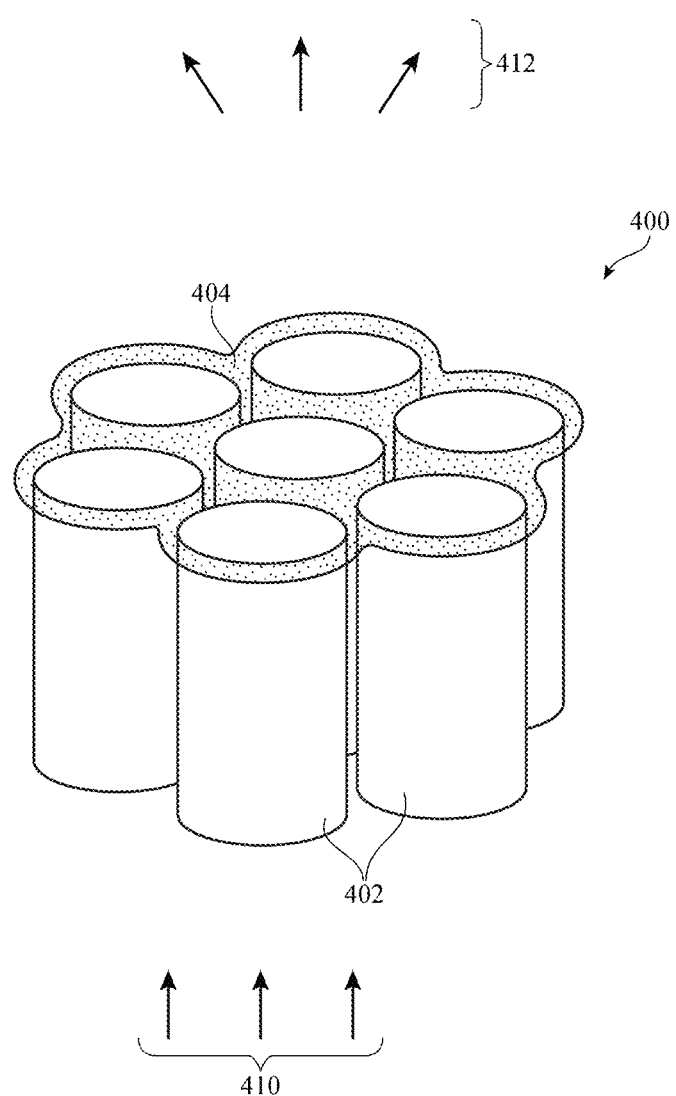
FIG. 18 is a perspective view of illustrative switchable optical fiber bundle structures for selectively collimating backlight in accordance with an embodiment.

In certain embodiments, the switchable diffuser may also be implemented using a switchable optical fiber bundle. As shown in FIG. 18, switchable optical fiber bundle 400 may include optical fibers 402 made of glass, plastic, or other suitable fiber material bundled together and bonded using polymer adhesive 404. In one configuration, switchable material such as PDLC or PNLC may be used as the binding material. In another configuration, the switchable material may be filled within the core of each optical fiber. When the switchable material is placed in a first state, the incoming collimated light 410 may be allowed to pass through substantially unaltered. When the switchable material is placed in a second state that is different than the first state, the incoming collimated light 410 may be altered and output as scattered light 412. If desired, the switchable optical fiber bundle 400 may also receive scattered backlight and can be used to selectively output collimated light.

Figure 14:
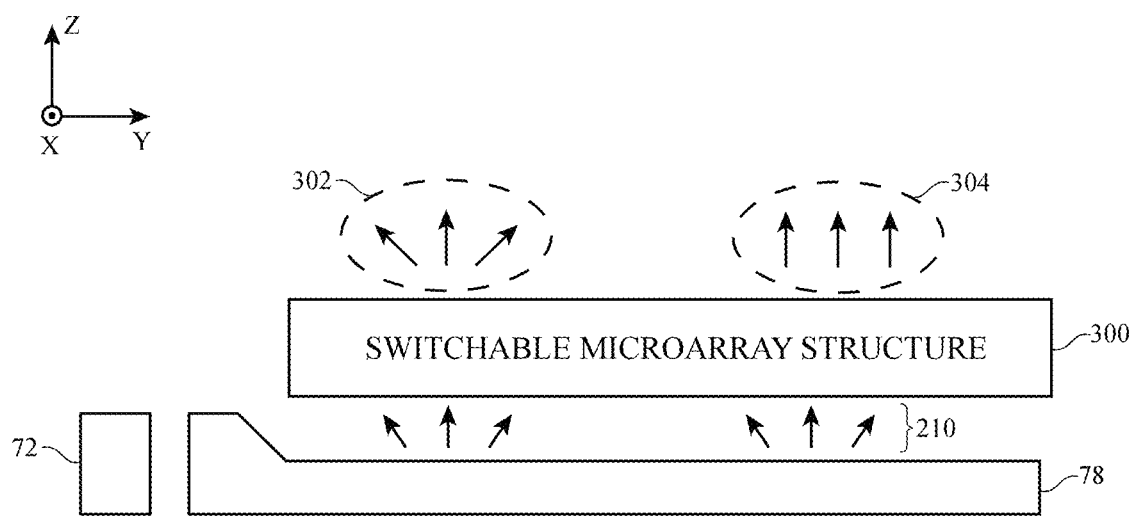
FIG. 14 is a cross-sectional side view of an illustrative switchable microarray structure for selectively collimating backlight in accordance with an embodiment.

In accordance with another embodiment, the different display modes described above may be implemented using a switchable microarray structure in the backlight unit. FIG. 14 is a cross-sectional side view showing how backlight unit 42 may be provided with a switchable microarray structure 300 that may be configured in an on state, an off state, or optionally one or more intermediate states for enhanced tunability.

In the embodiment of FIG. 14, light guide plate 78 may include light scattering features for emitting a generally scattered light source 210 upwards in direction Z. Switchable microarray structure 300 may directly receive the scattered light source 210 (without an intervening turning film) and may serve to convert the scattered light 210 into a collimated light source 304 or may otherwise pass through or further scatter the incoming light 210 to output scattered light 302. The configuration of the different display modes in FIG. 6 can therefore be controlled by adjusting the state of switchable microarray structure 300 (e.g., diffuser 300 can be turned off to place the display in normal viewing mode or can be turned on to place the display in one of modes 102, 104, or 106).

Figure 15:
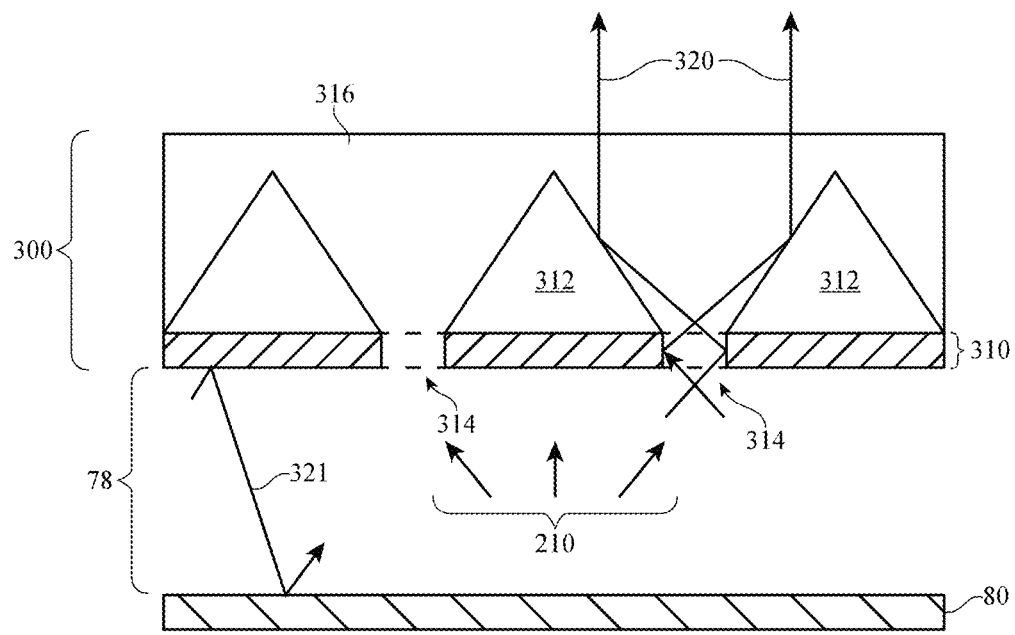
FIG. 15 is a cross-sectional side view of an illustrative pyramid microarray with switchable mirror structures for selectively collimating backlight in accordance with an embodiment.

FIG. 15 is a cross-sectional side view of an illustrative pyramid microarray with switchable mirror structures for selectively collimating backlight in accordance with an embodiment. As shown in FIG. 15, microarray structure 300 may include switchable mirror layer 310 having openings 314 and polymer material 316 that is formed over switchable mirror layer 310 and that may be patterned to form pyramid-shaped cavities 312. The cavities 312 may be filled with air or other material having a refractive index that is different than polymer 316.

Switchable mirror layer 310 may be implemented using cholesteric liquid crystal material, electrochromic material, or other types of materials with adjustable reflectivity. Similar to the PDLC material, mirror layer 310 may be selectively activated using a voltage source (not shown). When mirror 310 is configured in the on state, any backlight striking mirror 310 will be reflected back down towards reflector 80 (as indicated by path 321) whereas light may only be allowed to travel through layer 310 via the gaps 314. Any light that propagates through these gaps 314 will be guided by the pyramid-shaped cavities 312 to generate a collimated light source 320. The switchable mirror 310 operated in this way helps to convert the light emit directly from the light guide plate 78 into an array of point light sources. Light reflected from the mirror will therefore be recycled through the light guide and reflector 80, which helps to improve output efficiency. When mirror 310 is configured in the off state, mirror 310 will be effectively switched out of use (e.g., mirror 310 will no longer exhibit reflective capabilities) and light exiting structures 300 will remain uncollimated in the scattered state.

The pyramidal shape of cavities 312 in structure 300 is merely illustrative. If desired, cavities 312 may be formed with a conical shape, a trapezoidal shape, or other suitable shapes for guiding and focusing the light in a way to produce the desired viewing angle when mirror 310 is switched into use.

Figure 16:
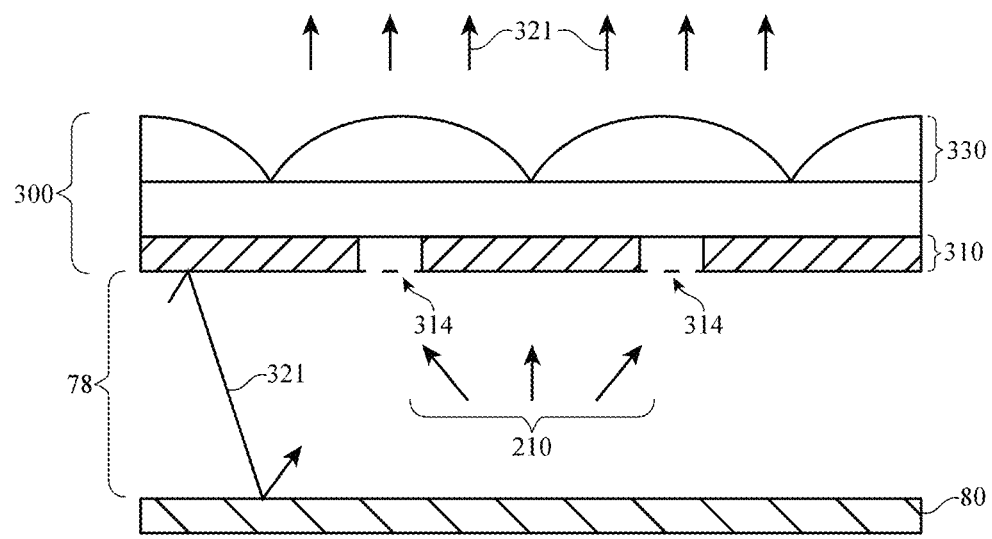
FIG. 16 is a cross-sectional side view of an illustrative microlens array with switchable mirror structures for selectively collimating backlight in accordance with an embodiment.

FIG. 16 shows yet another suitable arrangement in which structure 300 includes a microlens array 330 that is formed over switchable mirror structures 310. As shown in FIG. 16, the center of each microlens in array 330 may be aligned to corresponding gaps 314 in mirror layer 310. When mirror 310 is activated, any backlight striking mirror 310 will be reflected back down towards reflector 80 (as indicated by path 321) while some of the light may travel through layer 310 via openings 314. Any light that propagates through these openings will be focused using the microlens structures 330 to generate a collimated light source 321. The switchable mirror 310 operated in this way serves to convert the light emit from the light guide plate 78 into an array of point light sources at the gap locations. When switchable mirror 310 is deactivated, mirror 310 will be effectively switched out of use (e.g., mirror 310 will no longer exhibit reflective capabilities) and light exiting structure 300 will remain uncollimated in the scattered state.

Figure 17:
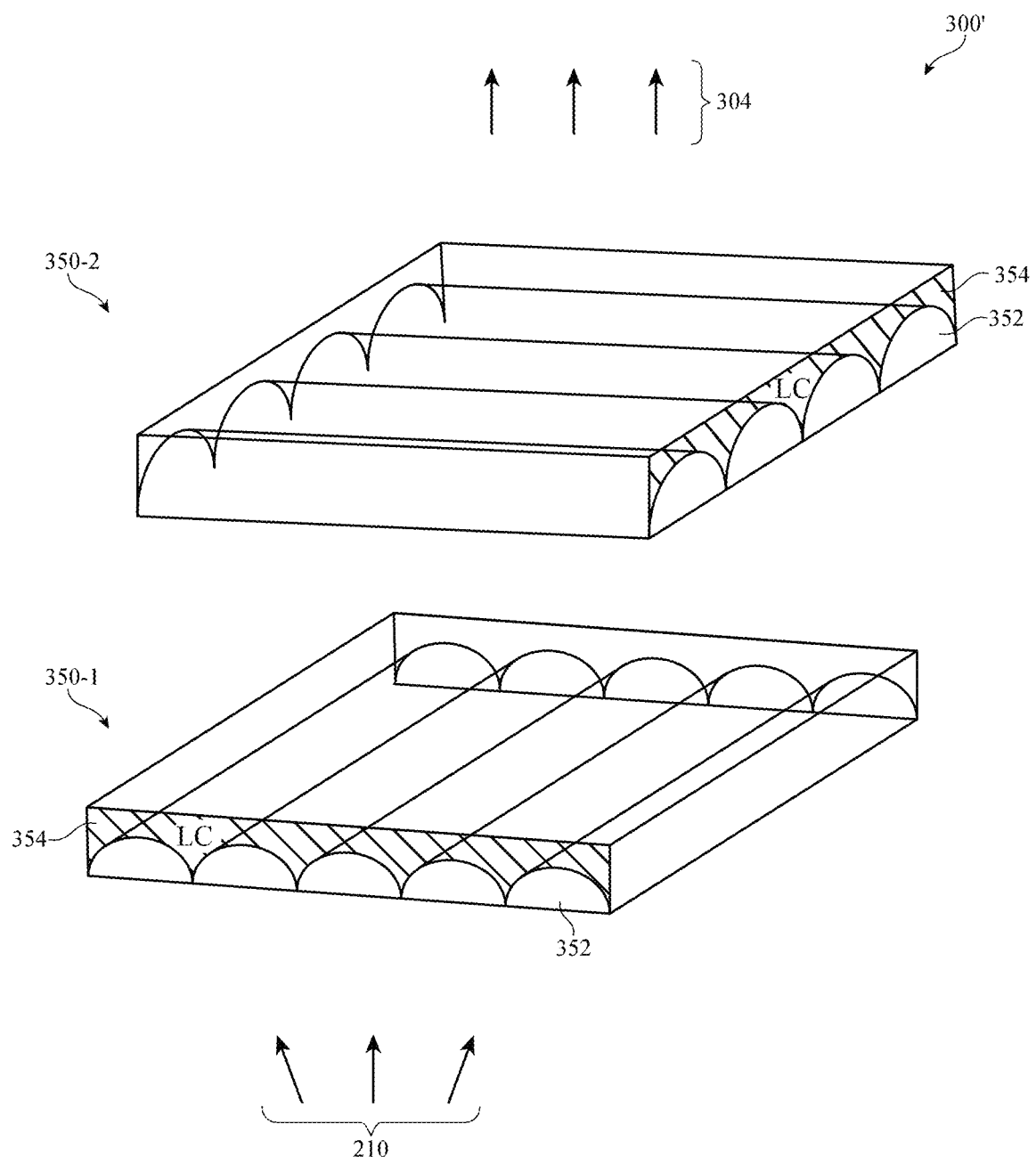
FIG. 17 is a perspective view of illustrative tunable microlens array structures for selectively collimating backlight in accordance with an embodiment.

In another suitable embodiment, the adjustable microarray structure may be implemented using a switchable liquid crystal (LC) lens array structure (see, e.g., switchable microlens array structure 300' in FIG. 17). As shown in FIG. 17, structure 300' may include a first adjustable LC lens array 350-1 stacked with a second adjustable LC lens array 350-2. Each layer of adjustable LC lens array may include rows of cylindrical lenses 352 covered with liquid crystal material 354. The cylindrical microlenses in layer 350-1 may be formed perpendicular to the cylindrical microlenses in layer 350-2 to help focus light from two orthogonal directions. In particular, lenses 352 may be polymer microlenses and may exhibit a "concave-down" orientation for selectively focusing light when the microlenses are switched into use. Layers 350-1 and 350-2 may be provided with patterned electrodes (e.g., conductive ITO structures) that can be selectively biases using voltage sources (not shown) to modulate the optical properties of the LC material 354.

For example, a high voltage may be applied across the liquid crystal material 354 so that the liquid crystal material 354 exhibits the same index of refraction as the polymer microlenses 352. When the polymer microlenses 352 and the liquid crystal material 354 are index-matched, no lensing effect is provided and the incoming scattered light 210 from the backlight unit is allowed to pass through without being collimated. When a low voltage is applied across the liquid crystal material 354, the liquid crystal material 354 may exhibit a different refractive index as the polymer microlenses 352. When the index of refraction of the microlenses 352 and the liquid crystal material 354 are mismatched, microlenses 352 are effectively switched into use to collimate the incoming scattered backlight 210 to generate a collimated outgoing light 304. This example is merely illustrative. In general, any desired amount of voltage can be applied to the LC material so that switchable microarray structure 300' exhibits the desired optical transmission/scattering property for each of the different view modes described in connection with FIG. 6. The example of FIG. 17 in which the microlenses are formed in a regular periodic configuration is merely illustrative. If desired, the microlens structures may be formed with random varying pitches and widths and may exhibit non-cylindrical shapes.

The tunable lens structures described in connection with FIGS. 13 and 17 are merely illustrative and do not serve to limit the scope of the present invention. In yet other suitable embodiments, the tunable microlens array structures may be implemented using mechanically driven microlens structures, microfluidic devices, polymer network liquid crystal (PNLC) based microlens structures, piezoelectrically driven liquid lens structures (e.g., dynamorph microlenses), ultrasonic transparent gel based lens structures, just to name a few. If desired, these tunable lens structures may be used in conjunction with switchable mirror structures (e.g., mirror 310 of FIGS. 15 and 16) and switchable diffuser film structures (e.g., as part of the embedded microlens array 260 of FIG. 12) to provide further tunability in the output light profile.

The embodiments described above in which the light output from the backlight unit is selectively collimated depending on the current viewing mode effectively reduces the luminance at higher viewing angles (e.g., the display appears darker as the user moves away from the normal axis of the display panel) and are therefore sometimes referred to as implementing a "black" mode.

In accordance with another suitable arrangement of the present invention, a switchable structure may be placed above the liquid crystal display layer to dynamically adjust the contrast ratio as a function of the viewing angle. For example, the switchable structure may be configured to reduce the contrast ratio as the user moves away from the normal axis of the display panel, thereby making the display appear lighter or more faded. Privacy mode implemented by reducing the contrast ratio is therefore sometimes referred to as "white" mode.

Figure 19:
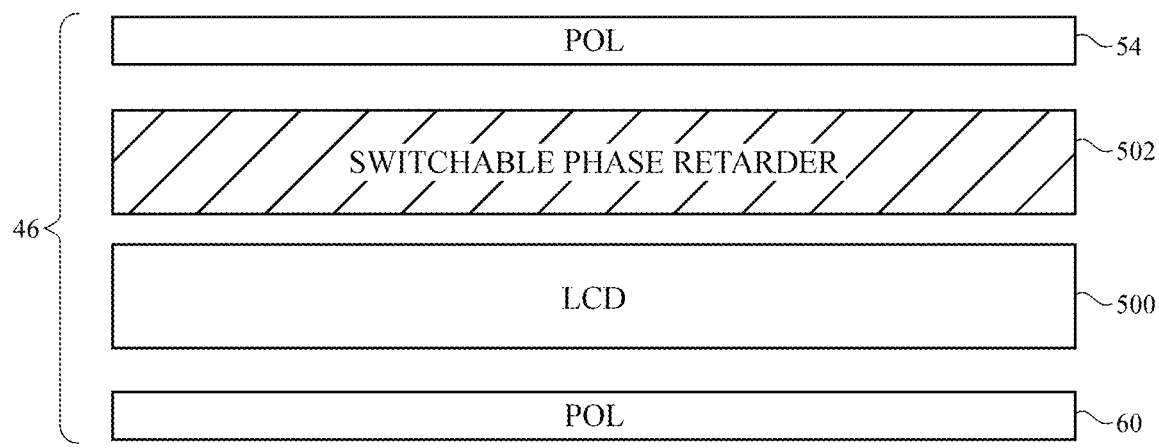
FIG. 19 is a cross-sectional side view of a display with a switchable phase retarder in accordance with an embodiment.

In accordance with an embodiment, the white privacy mode can be implemented using a switchable phase retarder that is stacked with the liquid crystal display (LCD) layer. As shown in FIG. 19, display layers 26 may include an LCD layer 500 formed between upper polarizer 54 and lower polarizer 60 and a dynamically tunable structure such as switchable phase retarder layer 502 interposed between upper polarizer 54 and LCD layer 500. Layer 500 may, for example, include layers 56, 52, and 58 of FIG. 5.

The exemplary configuration of FIG. 19 in which switchable phase retarder 502 is formed between upper polarizer 54 and LCD layer 500 is merely illustrative and does not serve to limit the scope of the present invention. If desired, switchable phase retarder 502 may be alternatively formed between lower polarizer 60 and LCD layer 500. In yet other suitable arrangements, a first switchable phase retarder may be sandwiched between upper polarizer 54 and LCD layer 500 while a second switchable phase retarder is sandwiched between bottom polarizer 54 and LCD layer 500.

Switchable phase retarder layer 502 may be configured to control the contrast of the display image at higher, oblique viewing angles (e.g., from 30° to 90°). Typically, display 14 may include phase compensation films such as optical films 70 described in connection with FIG. 5 to suppress light leakage at large viewing angles (i.e., to help enhance off-axis viewing by providing high contrast at wide viewing angles). By adding an additional switchable phase retarder film such as switchable phase retarder 502 into the display stack, the phase compensation function for oblique viewing angles can be adjusted.

Figure 20A:
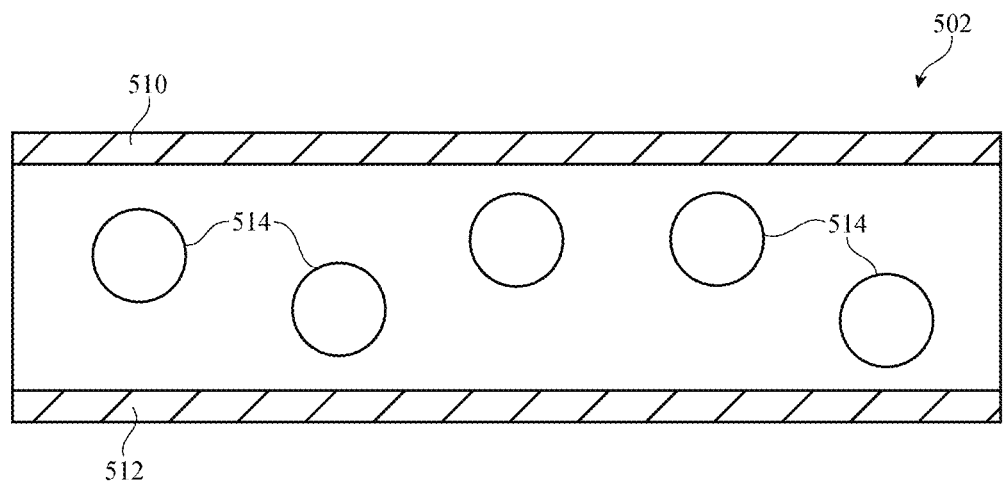
FIG. 20A is a diagram illustrating a switchable phase retarder in normal viewing mode in accordance with an embodiment.
Figure 20B:
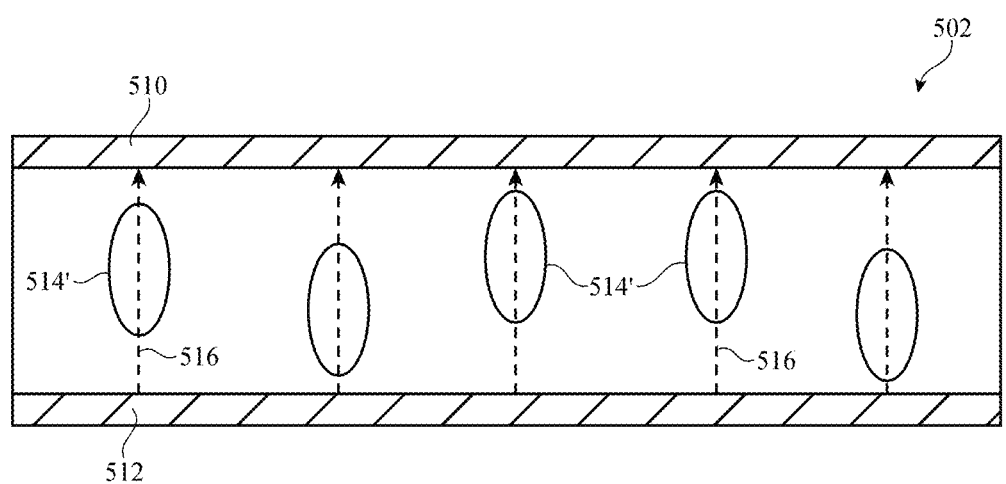
FIG. 20B is a diagram illustrating a switchable phase retarder in privacy mode in accordance with an embodiment.

Switchable phase retarder 502 may be operable in at least two modes. FIG. 20A shows switchable phase retarder 502 configured in normal viewing mode, whereas FIG. 20B shows switchable phase retarder 502 configured in privacy mode (which may also include the outdoor viewing mode and the power saving mode). As shown in FIG. 20, liquid crystal molecules 514 may be dispersed between transparent substrates 510 and 512. Substrates 510 and 512 may be formed from glass, plastic, or other transparent substrate material. Transparent conductive materials such as a layer of indium tin oxide (ITO) may be formed on each of substrates 510 and 512 to control the behavior of molecules 514.

In the example of FIG. 20A, retarder layer 502 may be placed in an off state when no voltage is applied so that molecules 514 are in an isotropic state. When operated in the isotropic mode, the phase retarder does not affect any phase or polarization of the propagating light because the retarder is optically isotropic with visible light; the retarder is therefore effectively switched out of use.

In the example of FIG. 20B, a voltage source may apply some amount of voltage across substrates 510 and 512 to create an electric field 516 so that the molecules are placed in an anisotropic state 514' (sometimes referred to as a chiral nematic phase). In the anisotropic mode, light coming from on-axis will not experience any phase retardation, and the polarization of the on-axis light is maintained. However, light passing through retarder 502 at oblique angles will experience phase retardation. As a result, images view on-axis will exhibit high contrast while images view from oblique angles will exhibit low contrast. By controlling the voltage applied, the resulting electric field may induce a birefringence in any suitable liquid crystal material via the Kerr effect to switch layer 502 between the two modes. As examples, switchable phase retarder 502 may be implemented using blue phase LC material, discotic phase LC material, bowlic phase LC material, lyotropic LC materials, micellar cubic phase LC materials, hexagonal phase LC material, metallotropic LC material, a combination of these materials, and/or other suitable types of switchable material.

Figure 21:
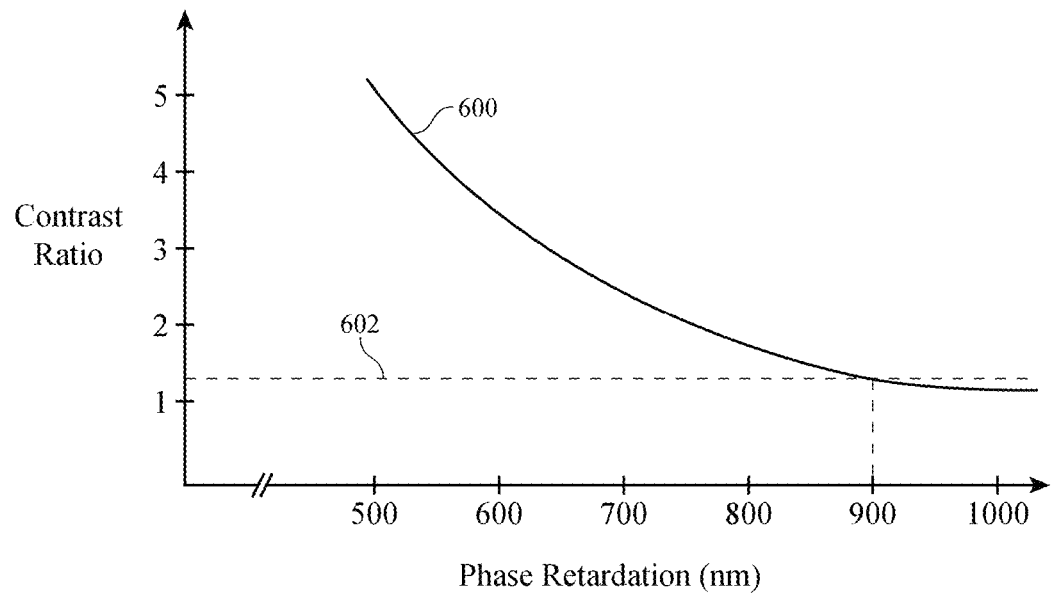
FIG. 21 is a plot of contrast ratio versus phase retardation that is provided by a switchable phase retarder at a particular viewing angle in accordance with an embodiment.

FIG. 21 is a plot of contrast ratio versus phase retardation that can be provided by switchable phase retarder 502 at an exemplary viewing angle of 30° in accordance with an embodiment. As shown by curve 600 in FIG. 21, contrast ratio may generally decrease as the amount of phase retardation is increased. In particular, line 602 may represent a threshold level below which the contrast ratio should be maintained in privacy mode. For example, a maximum contrast ratio of 1.2 may be deemed a sufficiently low contrast ratio to prevent users from reading the display at viewing angles greater than 30°. In the example of FIG. 21, a minimum phase retardation of 900 nanometers (nm) may be necessary to maintain the contrast ratio below predetermined threshold 602.

Figure 22:
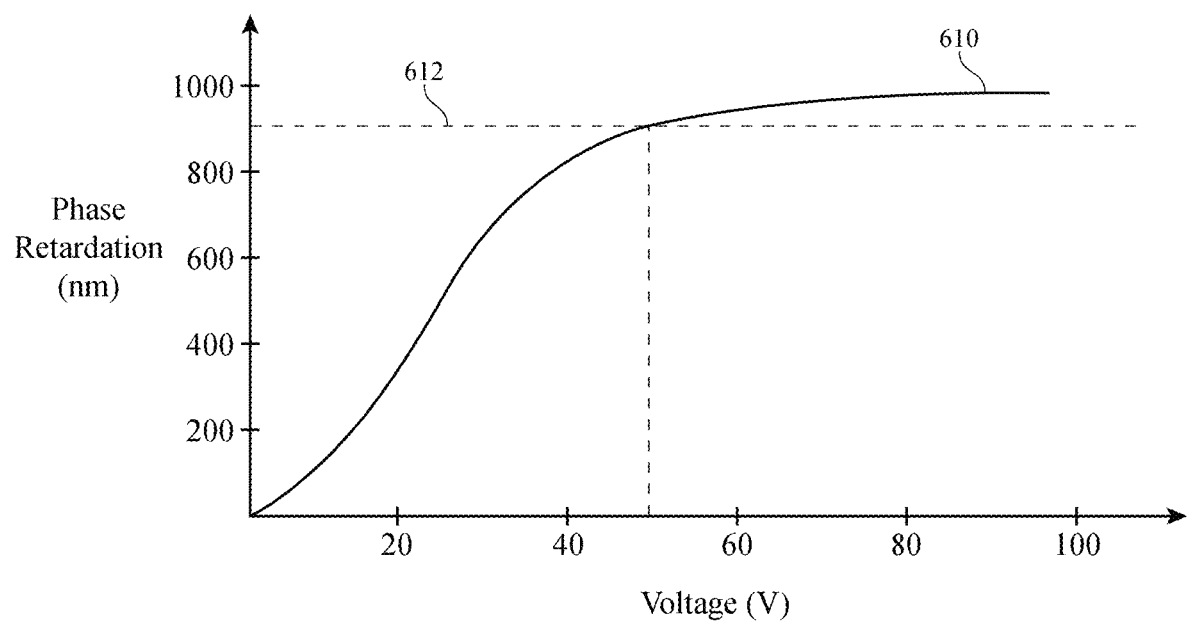
FIG. 22 is a plot of phase retardation versus bias voltage for a switchable phase retarder in accordance with an embodiment.

The amount of phase retardation may be controlled by the voltage applied across the switchable phase retarder. FIG. 22 is a plot of phase retardation versus bias voltage for switchable phase retarder 502 in accordance with an embodiment. As shown by curve 610 in FIG. 22, the amount of phase retardation generally increases as a function of applied voltage. To meet the 900 nm phase retardation requirement discussed in connection with FIG. 21 (as indicated by dotted threshold line 612 in FIG. 22), a minimum bias voltage of 50 V may have to be applied across the switchable phase retarder. Voltages of greater than 50 V may also be applied to provide extra margin at the expense of power consumption. The amount of phase retardation and the amount of bias voltage that are required to provide the desired contrast ratio shown in FIGS. 21 and 22 are merely illustrative and are not intended to limit the scope of the present invention. Other threshold contrast levels corresponding to other phase retardation and bias voltage levels may be used to provide the desired amount of privacy.

Figure 23:
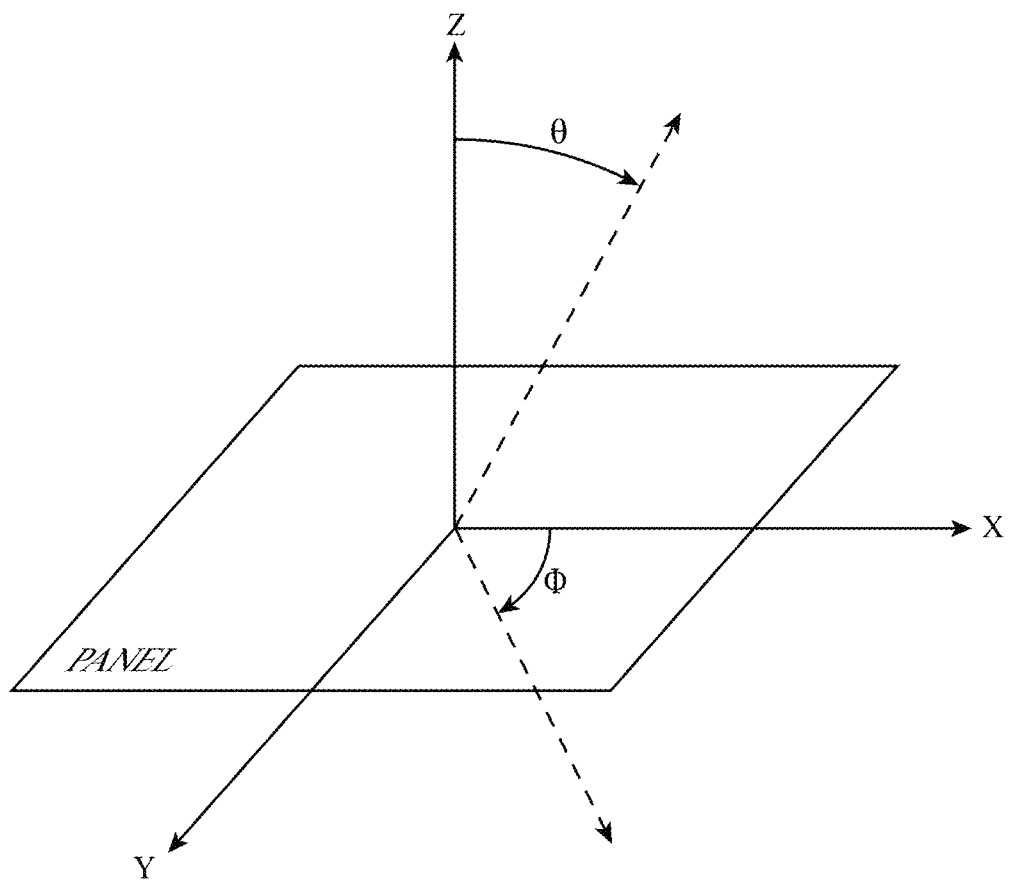
FIG. 23 is diagram illustrating different viewing angles of a display panel in accordance with an embodiment.

FIG. 23 is diagram illustrating different viewing angles of a display panel. The X-Y axes form a plane that is coplanar with the display panel, whereas the Z axis represents a normal axis that is orthogonal to the plane of the display panel. Angle θ represents a viewing angle from the Z axis. If angle φ is fixed at zero degrees, then angle θ will correspond to the viewing angles illustrated and described in connection with FIG. 7. On the other hand, angle φ represents a viewing angle in the X-Y plane. Assuming the display panel is in the upright position on the tabletop, a viewer's elevation will change as angle φ is varied. In general, it is desirable for a display to exhibit reduced contrast ratios for angles θ greater than 30° at an angle φ of zero or 180 degrees during privacy viewing modes.

Figure 24A:
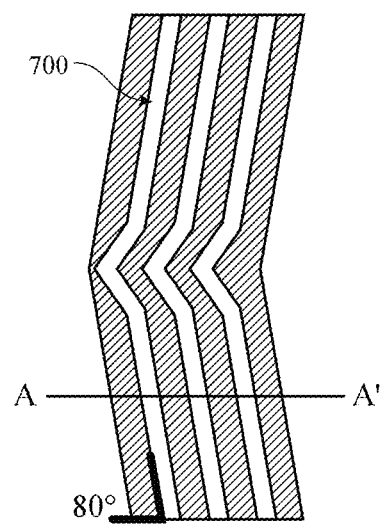
FIG. 24A is a diagram of an exemplary display pixel design in accordance with an embodiment.

FIG. 24A is a diagram of an exemplary display pixel design in accordance with an embodiment. As shown in FIG. 24A, the display may include pixel electrodes 700 patterned in a conventional chevron formation, where each separate electrode is angled at approximately 80°.

Figure 24B:
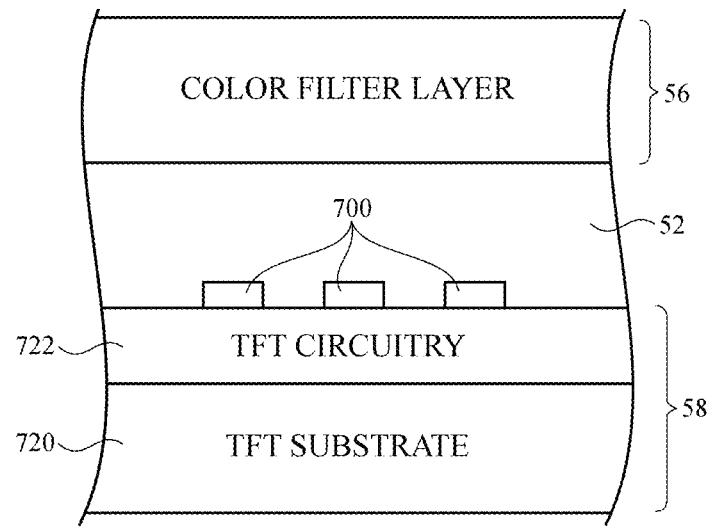
FIG. 24B is a cross-sectional side view showing the conductive pixel fingers in accordance with an embodiment.

FIG. 24B is a cross-sectional side view of the display pixel circuitry shown in FIG. 24A cut along line AA'. As shown in FIG. 24B, pixel electrodes 700 (e.g., indium tin oxide electrodes or "fingers") may be formed on TFT layer 58 (see, e.g., FIG. 5). TFT layer 58 may include TFT circuitry 722 such as thin-film transistor structures formed over TFT substrate 720. Liquid crystal material 52 may formed over pixel fingers 700 between TFT layer 58 and color filter layer 56. If desired, the order of TFT layer 58 and color filter layer 56 can be flipped such that light exits the display by passing through color filter layer 56 before passing through TFT layer 58.

Figure 25:
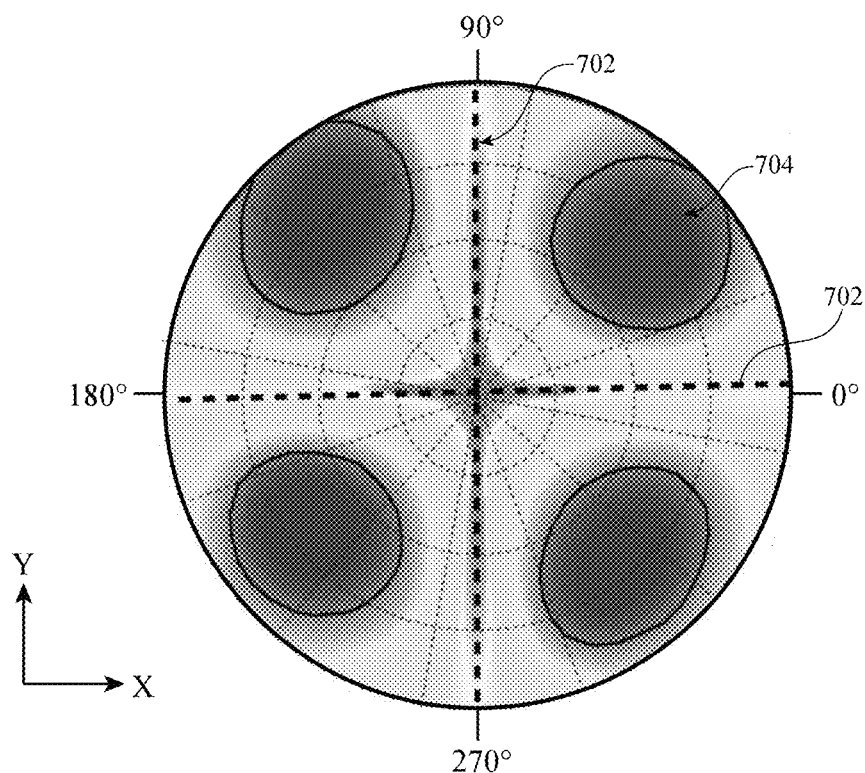
FIG. 25 is a plot showing regions of low contrast ratio for a display implemented using the display pixel design of FIG. 24A in accordance with an embodiment.

FIG. 25 is a plot showing regions of low contrast ratio in the X-Y plane for a display implemented using the chevron pixel electrode arrangement of FIG. 24A. As shown in FIG. 25, the lighter regions corresponding to dotted axes 702 where angle φ is approximately zero or 90 degrees represent areas of high contrast, whereas the darker regions 704 centered at angles φ of approximately 45, 135, 215, and 315 degrees represent areas of low contrast. Note that the contrast ratio generally decreases as one moves away from the center of the plot (i.e., as viewing angle θ increases).

Figure 26:
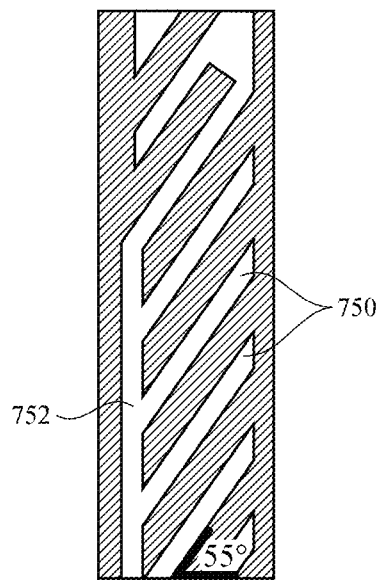
FIG. 26 is a diagram of an improved display pixel design having a rotated pixel alignment orientation in accordance with an embodiment.

In the example of FIG. 25, the low contrast regions 704 are undesirably offset by 45°. As described above, it is generally desirable to align the low contrast regions to angles φ of zero or 180 degrees since that would reduce view-ability from undesired, nearby or adjacent onlookers. In an effort to effectively rotate the contrast profile provided by the switchable phase retarder, an improved display pixel design is provided (see, e.g., FIG. 26). As shown in FIG. 26, the pixel electrodes 750 (sometimes referred to here as conductive "fingers") are angled at 55°. This difference in finger angle relative to the chevron design of FIG. 25 provides the desired rotation. The pixel fingers 750 may be formed from indium tin oxide (ITO) or other suitable transparent conductive material and may be interconnected using a vertical shorting sidebar member 752.

Figure 27:
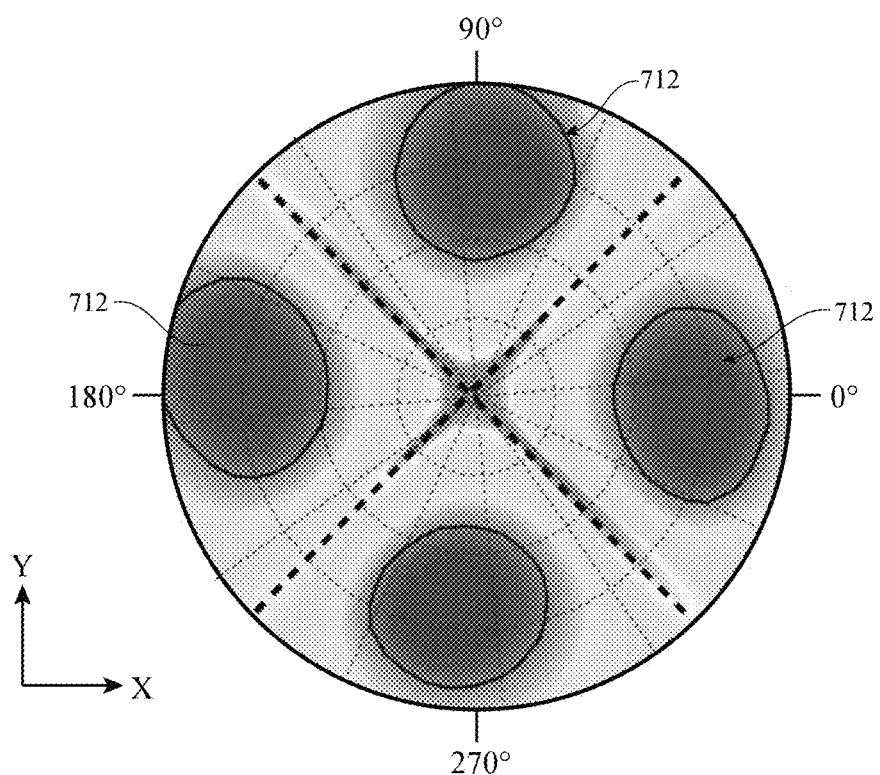
FIG. 27 is a plot showing regions of low contrast ratio for a display implemented using the display pixel design of FIG. 26 in accordance with an embodiment.

FIG. 27 is a plot showing regions of low contrast ratio in the X-Y plane for a display implemented using the rotated pixel finger arrangement of FIG. 26. As shown in FIG. 26, the low contrast regions 712 have been aligned to angles φ of zero and 180 degrees. Additionally, users viewing from directly above and below (i.e., at φ of 90 and 270 degrees) will also perceive the reduced contrast ratio. Configured in this way, the display will be able to provide the desired privacy protection from viewers sitting laterally with respect to the intended user.

Figure 28:
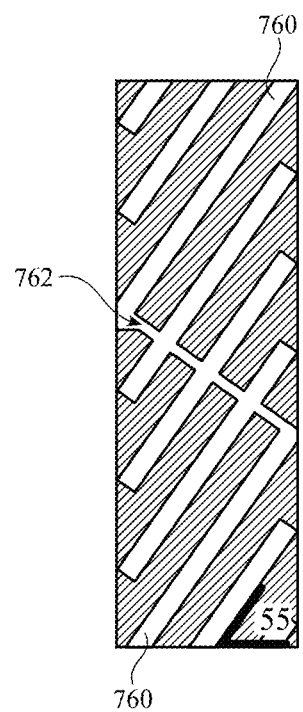
FIG. 28 is a diagram of an illustrative single-domain display pixel design having a crossbar in accordance with an embodiment.

In accordance with another suitable arrangement, FIG. 28 shows a rotated pixel design having fingers 760 interconnected by a conductive crossbar such as ITO crossbar 762. In the example of FIG. 28, crossbar 762 may be relatively thinner than fingers 760 to help improve transmittance. As an example, the fingers 760 may be 3 microns wide while crossbar 762 may be only 2 microns wide. The configuration of FIG. 28 may also provide a contrast profile similar to that shown in FIG. 27. The embodiments of FIGS. 26 and 28 in which all of the conductive fingers are formed parallel to one another are sometimes referred to as a single-domain pixel electrode implementation.

Figure 29:
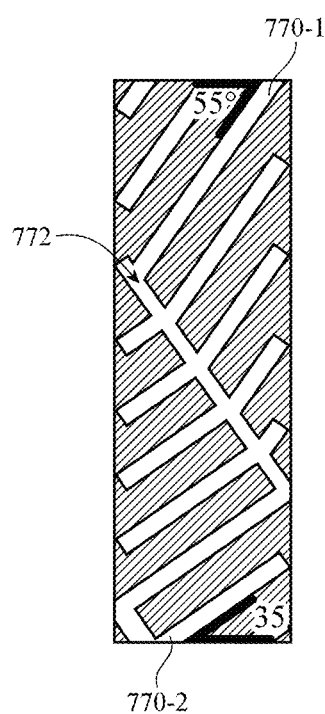
FIG. 29 is a diagram of an illustrative dual-domain display pixel design with a crossbar in accordance with an embodiment.

In accordance with yet another suitable arrangement, FIG. 29 shows a rotated pixel design having fingers formed at multiple different angles. As shown in FIG. 29, a first group of parallel fingers 770-1 may be formed at an angle of 55°, whereas a second group of parallel fingers 770-2 may be formed at angle of 35°. The two groups of fingers 770-1 and 770-2 may be shorted using a conductive crossbar such as ITO crossbar 772. This configuration in which there are two sets of conductive fingers formed at slightly different angles is sometimes referred to as a dual-domain pixel electrode implementation.

The pixel designs of FIGS. 26, 28, and 29 are merely illustrative and are not intended to limit the scope of the present invention. The pixel electrodes in FIGS. 26, 28, and 29 can also be formed as part of TFT layer 58 as shown in FIG. 24B. In general, the display may include pixel electrode fingers patterned at any suitable angle that yields the contrast plot of FIG. 27 and may include any number of domains of parallel fingers.

Figure 30:
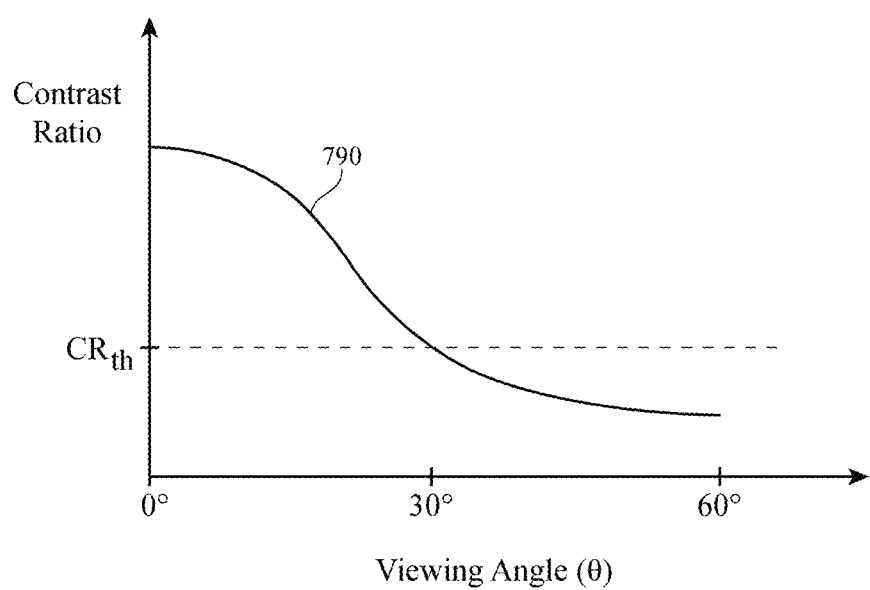
FIG. 30 is a plot of contrast ratio versus viewing angle for a display implemented using a display pixel design of the type shown in the embodiments of FIGS. 26, 28, and 29 in accordance with an embodiment.

FIG. 30 is a plot of contrast ratio versus viewing angle for a display implemented using a display pixel finger design of the type shown in the embodiments of FIGS. 26, 28, and 29 in accordance with an embodiment. As shown by curve 790 in FIG. 30, the contrast ratio falls below the threshold level $CR_{Th}$ for viewing angle θ of greater than 30°. Curve 790 in FIG. 30 corresponds to the contrast profile at ϕ of zero degrees. If desired, the crossover point where curve 790 intersects with the desired privacy threshold level $CR_{Th}$ may be adjusted (e.g., to 45°, 60°, etc.) by changing the amount of phase retardation, the amount of bias voltage, the pixel electrode finger design, the type of switchable phase retarder material, etc.

Figure 31:
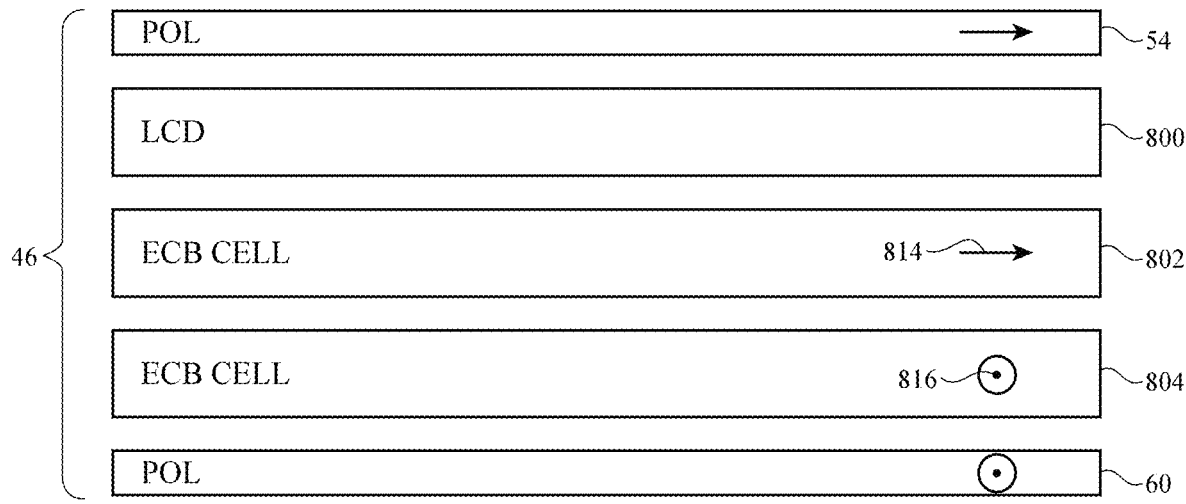
FIG. 31 is a diagram of a display with multiple electrically controlled birefringence (ECB) layers in a normal viewing mode in accordance with an embodiment.

In accordance with another suitable embodiment, display layers 46 may also be provided with electrically controlled birefringence (ECB) layers that can help provide reduced visibility during privacy mode (which may also include the outdoor viewing mode and the power saving mode). FIG. 31 is a diagram of a display with multiple electrically controlled birefringence (ECB) layers in a normal viewing mode in accordance with an embodiment. As shown in FIG. 31, a first ECB cell 802 and a second ECB cell 804 may be interposed between LCD layer 800 and lower polarizer 60. Layer 800 may, for example, include layers 56, 52, and 58 of FIG. 5. This is merely illustrative. In another suitable arrangement, first and second ECB cells 802 and 804 may be interposed between upper polarizer 54 and LCD layer 800. In yet another suitable arrangement, first ECB cell 802 may be interposed between upper polarizer 54 and LCD layer 800 while second ECB cell 804 may be interposed between lower polarizer 60 and LCD layer 800.

Front polarizer 54 may have an absorption axis (sometimes also referred to as transmittance axis) oriented towards the right of the page, whereas back polarizer 60 may have an absorption axis oriented straight out of the page. During normal viewing mode, the ECB cells may be switched out of use such that ECB cell 802 exhibits an optical axis 814 that is parallel to the absorption axis of upper polarizer 54 while ECB cell 804 exhibits an optical axis 816 that is parallel to the absorption axis of lower polarizer 60.

Figure 32:
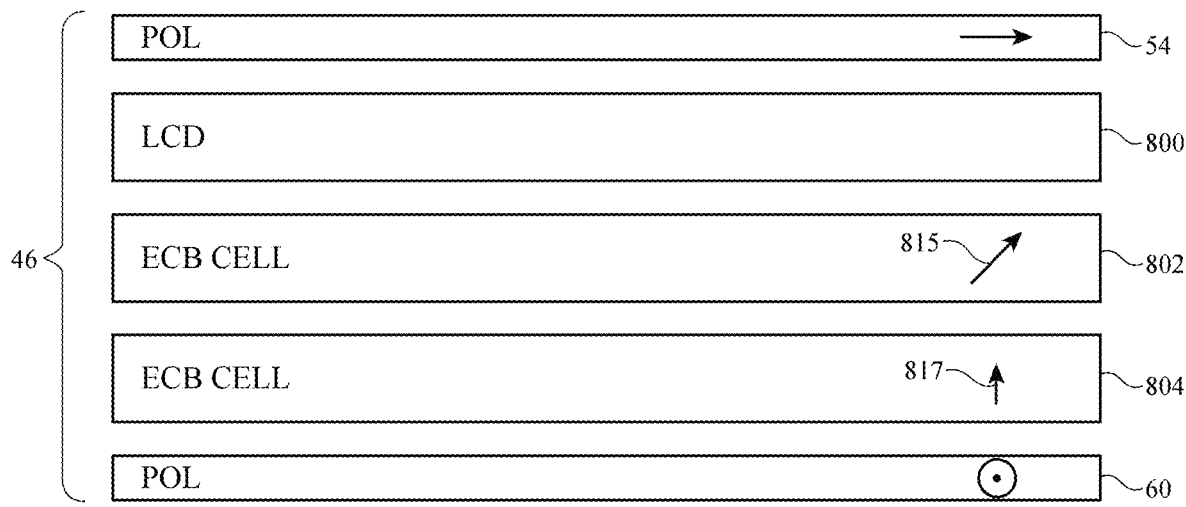
FIG. 32 is a diagram of the display of FIG. 31 configured in privacy mode in accordance with an embodiment.

FIG. 32 shows the display layers 46 when privacy mode is engaged. Voltage may be applied to rotate the optical axes of the ECB cells. As shown in FIG. 32, the optical axis of ECB cell 802 may be rotated to a new orientation 815 (e.g., towards the right of the page but slightly up towards the front polarizer) that is out of alignment with the absorption axis of front polarizer 54. Similarly, the optical axis of ECB cell 804 may also be rotated to a new orientation 817 (e.g., out of the page but slightly up towards the front polarizer) that is out of alignment with the absorption axis of back polarizer 60.

Figure 33:
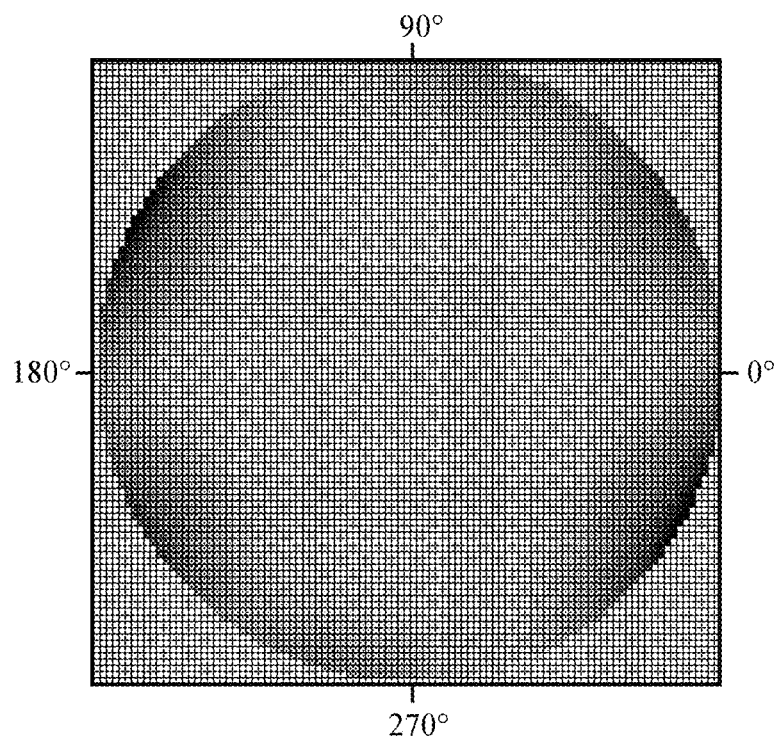
FIG. 33 is a plot showing the contrast ratio for the display in FIG. 31 in accordance with an embodiment.
Figure 34:
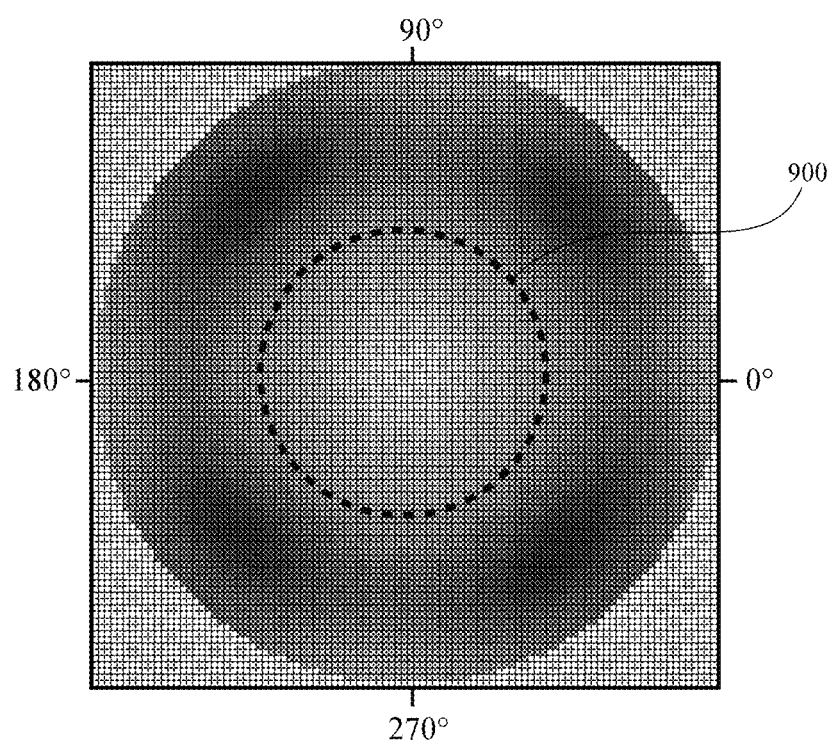
FIG. 34 is a plot showing regions of low contrast ratio for the display in FIG. 32 in accordance with an embodiment.

FIG. 33 is a plot showing the contrast ratio for the display in FIG. 31 during normal user mode. As shown in FIG. 33, the display does not exhibit any reduction in contrast ratio in any direction when the ECB cells are switched out of use. FIG. 34 is a plot showing the contrast ratio for the display in FIG. 32 during privacy mode (or outdoor viewing mode or power saving mode). As shown in FIG. 34, the display may exhibit high contrast for the intended cone of vision 900 while providing substantially reduced contrast levels outside region 900. Comparing the profiles of FIG. 34 with that of FIG. 27, the dual ECB cell implementation may provide additional privacy since it offers reduced visibility from all directions.

The dual ECB layer implementation described in connection with FIGS. 31 and 32 is merely illustrative and is not intended to limit the scope of the present embodiments. If desired, only one ECB layer or more than two ECB layers may be provided in the display. If desired, other types of nematic display layers may be engaged to help limit the viewability of the display to the desired cone of vision. For example, one or more dual-domain ECB cells (e.g., an ECB cell in which the optical axis in different regions of the ECB cell tilt in opposite directions but in the same plane) may also be used within the display.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    display layers that include display pixels;
    a backlight unit configured to output backlight towards the display layers; and
    an adjustable layer that is selectively activated to collimate the backlight and that is selectively deactivated so that the backlight passes through the adjustable layer without being collimated.

2. The display of claim 1, wherein the adjustable layer comprises a plurality of light blocking structures.

3. The display of claim 2, wherein the plurality of light blocking structures comprise reflective structures.

4. The display of claim 3, wherein the reflective structures have adjustable reflectivity.

5. The display of claim 1, wherein the adjustable layer comprises a plurality of angled structures configured to help collimate the backlight.

6. The display of claim 1, wherein the adjustable layer comprises a plurality of light collimating structures each of which has a first width at a first end and a second width that is different than the first width at a second end opposing the first end.

7. The display of claim 1, wherein the adjustable layer is electrically adjustable to collimate the backlight in a privacy mode.

8. A display, comprising:
    display layers that include display pixels;
    a backlight unit configured to output backlight towards the display layers; and
    an adjustable layer operable to deflect the backlight in a first manner during a first display mode and operable to deflect the backlight in a second manner different than the first manner during a second display mode.

9. The display of claim 8, wherein the adjustable layer collimates the backlight during the first display mode.

10. The display of claim 9, wherein the adjustable layer does not collimate the backlight during the second display mode.

11. The display of claim 8, wherein the backlight passes through the adjustable layer during both the first and second display modes.

12. The display of claim 8, wherein the adjustable layer comprises a plurality of angled structures configured to deflect the backlight in the first manner.

13. The display of claim 8, wherein the adjustable layer comprises a plurality of light collimating structures each of which has a first width and a second width that is different than the first width.

14. The display of claim 13, wherein the plurality of light collimating structures are formed directly on electrically controllable structures.

15. A display, comprising:
 display layers that include display pixels;
 a backlight unit configured to output backlight towards the display layers; and
 a plurality of electrically adjustable light blocking structures interposed between the backlight unit and the display layers, wherein the backlight passes through the plurality of electrically adjustable light blocking structures during a privacy mode and during a normal viewing mode.

16. The display of claim 15, wherein the plurality of electrically adjustable light blocking structures are configured to provide a first amount of reflectivity during the privacy mode and to provide a second amount of reflectivity different than the first amount of reflectivity during the normal viewing mode.

17. The display of claim 15, wherein the plurality of electrically adjustable light blocking structures are configured to deflect the backlight using a first scheme during the privacy mode and are configured to deflect the backlight using a second scheme that is different than the first scheme during the normal viewing mode.

18. The display of claim 15, wherein the plurality of electrically adjustable light blocking structures comprise slanted structures.

19. The display of claim 18, wherein the slanted structures are configured to collimate the backlight during the privacy mode.

20. The display of claim 18, wherein the slanted structures each have at least two different widths.

* * * * *